(12) United States Patent
Reshef et al.

(10) Patent No.: US 7,003,536 B2
(45) Date of Patent: Feb. 21, 2006

(54) REDUCED COMPLEXITY FAST HADAMARD TRANSFORM

(75) Inventors: Ehud Reshef, Qiryat Tivon (IL); Idan Alrod, Tel Aviv (IL)

(73) Assignee: Comsys Communications & Signal Processing Ltd., Herzelca (IL)

( * ) Notice: Subject to any disclaimer, the term of this patent is extended or adjusted under 35 U.S.C. 154(b) by 327 days.

(21) Appl. No.: 10/219,962

(22) Filed: Aug. 15, 2002

(65) Prior Publication Data

US 2004/0034676 A1   Feb. 19, 2004

(51) Int. Cl.
*G06F 7/14* (2006.01)
(52) U.S. Cl. ...................................... 708/410
(58) Field of Classification Search ............... 708/410, 708/400; 382/281
See application file for complete search history.

(56) References Cited

U.S. PATENT DOCUMENTS

| | | | |
|---|---|---|---|
| 3,754,128 A | 8/1973 | Corinthios | 235/156 |
| 3,792,355 A | 2/1974 | Miyata et al. | 375/254 |
| 3,859,515 A | 1/1975 | Radcliffe | 708/410 |
| 3,956,619 A | 5/1976 | Mundy et al. | 708/410 |
| 4,446,530 A | 5/1984 | Tsuboka | 708/410 |
| 4,621,337 A * | 11/1986 | Cates et al. | 708/410 |
| 5,561,618 A * | 10/1996 | Dehesh | 708/400 |
| 5,574,675 A * | 11/1996 | Lin | 708/410 |
| 5,608,722 A | 3/1997 | Miller | 370/320 |
| 5,644,523 A * | 7/1997 | Lin | 708/607 |
| 5,856,935 A | 1/1999 | Moy et al. | 708/410 |
| 5,926,488 A | 7/1999 | Khayrallah | 714/752 |
| 5,968,198 A | 10/1999 | Hassan et al. | 714/752 |
| 6,028,889 A | 2/2000 | Gude et al. | 375/150 |
| 6,311,202 B1 | 10/2001 | Hahm | 708/410 |
| 2001/0007110 A1 * | 7/2001 | Shoji | 708/400 |
| 2003/0152164 A1 * | 8/2003 | George | 375/316 |

OTHER PUBLICATIONS

S. Samadi et al., "On Automatic Derivation of Fast Hadamard Transform Using Genetic Programming", Proc. 1998 IEEE Asia-Pacific Conference on Circuits and Systems, Thailand, pp. 327-330, 1998.

Gumas, "A century old, the fast Hadamard transform proves useful in digital communications", Personal Engineering & Instrumentation News, pp. 57-63.

Assmus et al., "Hadamard Matrices and Their Designs: A Coding Theoretic Approach", Oct. 1989.

* cited by examiner

*Primary Examiner*—D. H. Malzahn
(74) *Attorney, Agent, or Firm*—Zaretsky & Associates; Howard Zaretsky

(57) ABSTRACT

A method and apparatus for performing a radix-4 fast Hadamard transform (FHT) with reduced complexity and for directly determining the maximum output of a fast Hadamard transform using either a radix-4 transform or radix-2 transform without actually generating the outputs. The radix-4 fast Hadamard transform is implemented using only seven operations. To find the maximum value of the output of a fast Hadamard transform and its corresponding index, the N-1 stages of a conventional N stage fast Hadamard transform are computed while a find-maximum stage is inserted in place of the $N^{th}$ stage. The invention also provides a methodology for constructing fast Hadamard transforms of the form $H_{2^N}$ using radix-4 FHTs and permuting the results to achieve the correct outputs.

31 Claims, 15 Drawing Sheets

REDUCED COMPLEXITY FAST HADAMARD TRANSFORM

FIELD OF THE INVENTION

The present invention relates generally to the area of Hadamard transforms and more particularly relates to a method and apparatus for performing reduced complexity fast Hadamard transforms (FHT).

BACKGROUND OF THE INVENTION

The Hadamard matrix and related Hadamard transform are mathematical techniques that have been known for over one hundred years. Jacques Hadamard published his original work in 1893 and work in similar areas was published by Rademacher in 1922 and Walsh in 1923. The origins of the Hadamard matrix, however, go back at least to 1867 when Sylvester published an early construction of what would later be known as the Hadamard matrix.

The term Hadamard transform is meant to denote any transformation of an N×1 vector by an N×N matrix $H_N$ with elements +1 and −1 that satisfies the following $$H_N H_N^T = N I_N \tag{1}$$

where $I_N$ is the identity matrix of order N. Matrices for arbitrary values of N can be constructed, however for certain values, the construction is non-trivial. The most convenient Hadamard matrices are of the square Sylvester type which are based on the fundamental matrix $$H_2 = \begin{bmatrix} 1 & 1 \\ 1 & -1 \end{bmatrix} \tag{2}$$

Sylvester type Hadamard matrices with N=2' can be constructed relatively easily using the following procedure $$H_{2^n} = \underbrace{H_2 \otimes \ldots \otimes H_2}_{n \text{ times}} \tag{3}$$

For example, a second order Hadamard matrix $H_4$ is given by $$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \tag{4}$$

Multiplying a 2-point vector $x=[x_0 \ x_1]^T$ by $H_2$ results in the sum and difference of the two points, i.e. $y=H_2 x$.

$$\begin{bmatrix} y_0 \\ y_1 \end{bmatrix} = \begin{bmatrix} x_0 + x_1 \\ x_0 - x_1 \end{bmatrix} \tag{5}$$

This results in the radix-2 or 2-point Hadamard transform of the vector x which is the same as the 2-point discrete Fourier transform (DFT). The sum and difference operation is known as a 2-point butterfly because of the crossing flow of data from the input to output. This butterfly is used not only in the fast Fourier transform (FFT) but the fast Hadamard transform (FHT) as well.

A block diagram illustrating a prior art 2-point fast Hadamard transform butterfly structure is shown in FIG. 1. The radix-2 FHT, generally referenced 10, comprises two summations 12, 14 that receive the crossover inputs a and b. Summation 12 generates the sum component a+b and the summation 14 generates the difference a−b.

Using the Sylvester construction permits the generation of higher order Hadamard matrices by use of recursion. For any integer value n, the $n^{th}$ order matrix $H_{2^n}$ has a size N×N where $N=2^n$. Any matrix of order $H_{2^n}$ can be generated using the recursion $H_{2^n} = H_2 \hat{\times} H_{2^{n-1}}$ where $\hat{\times}$ denotes the Kronecker multiplication operation.

A Hadamard matrix $H_8$ of order 3 may be constructed by cascading together three $H_2$ transform stages as shown in FIG. 2. The implementation of the $H_8$ transform, generally referenced 20, comprises three $H_2$ stages comprising three columns of $H_2$ blocks 24, 26, 28. The first stage is adapted to receive the eight input symbols 22, labeled $w_0$ through $w_7$. The output of the first stage 24 is input to the second stage 26 whose output is then input to the third and final $H_2$ transform stage 28 to generate the overall output 34, labeled $s_0$ through $s_7$, of the $H_8$ transform.

The second order 4×4 Hadamard matrix $H_4$ (n=2) is generated by taking the $H_2$ matrix and substituting $H_2$ for each '1' element, as follows $$H_4 = \begin{bmatrix} H_2 & H_2 \\ H_2 & -H_2 \end{bmatrix} \tag{6}$$

A block diagram illustrating a prior art 4-point fast Hadamard transform structure constructed using radix-2 fast Hadamard transforms is shown in FIG. 3. The $H_4$ transform, generally referenced 40, is constructed from four $H_2$ fast Hadamard transforms 42 connected in a standard butterfly configuration. The four inputs are split into pairs and applied to two $H_2$ transform modules that form a first stage. Similarly, a pair of outputs from each of the second stage $H_2$ transform modules make up the four outputs.

Hadamard matrices have several useful properties resulting in their use in a wide variety of applications such as in digital communications systems like Wideband Code Division Multiple Access (W-CDMA) mobile communications systems where they are used for base to mobile (forward channel) and mobile to base (reverse channel) transmissions. Hadamard matrices and their transforms can be found in signal compression algorithms and encoding and decoding algorithms, for example.

Several properties of Hadamard matrices include: symmetry (the $p^{th}$ row is equal to the $p^{th}$ column) and orthogonality (the dot product between any two different rows equals zero). Thus, comparing any two rows results in N/2 places matching and N/2 places differing. Thus, the Hamming distance between any two rows is N/2. Hadamard matrices are also self inverting $$H_n^{-1} = \frac{1}{n} H_n \tag{7}$$

Another property is the sequence number of each row which indicates the number of transitions from +1 to −1 and from −1 to +1. The sequence number of a row is termed its sequency because it measures the number of zero crossings in a given interval, analogous to the frequency of a sinusoid. The sequency of a row does not necessarily match its natural order or row number.

Since the Hadamard matrix is made up of ±1s, the computation consists of additions and subtractions of the input matrix elements. Implementing the Hadamard transform using straightforward matrix multiplication, however, requires $O(N^2)=O(2^{2n})$ operations. To speed computation, there exist many prior art Fast Hadamard transform algorithms that exploit the numerous symmetries of the Hadamard matrix. Most of the FHT algorithms require $O(N\log_2 N)=O(n2^n)$ additions. The prior art algorithms do not require multiplications which make them attractive for implementation on cheap, simple digital processing hardware. In many applications, however, it would be beneficial to reduce even further the number of additions needed to implement the Fast Hadamard transform.

There is thus a need for a reduced complexity fast Hadamard transform that is efficient and low cost that requires less addition operations than prior art transforms without sacrificing accuracy and performance.

SUMMARY OF THE INVENTION

The present invention is a method and apparatus for performing a radix-4 fast Hadamard transform with reduced complexity. The invention also comprises a method and apparatus for directly determining the maximum output of a fast Hadamard transform using either the radix-4 transform or radix-2 transform of the present invention.

The conventional approach to performing a fast Hadamard transform is to use the well-known radix-2 butterfly structure. In accordance with the present invention, a radix-4 structure is provided which enables a lowering of the computational complexity. A radix-4 FHT structure is described that utilizes only seven additions and multiplications by 2 which are implemented as binary shifts that do not cost any computing operations.

The invention also provides a mechanism to find the maximum value of a fast Hadamard transform and its corresponding index. In many applications it is not required to actually compute the outputs of the fast Hadamard transform but rather only to determine its maximal value and corresponding index. In accordance with the present invention, the N−1 stages of a conventional N stage fast Hadamard transform are computed while a find-maximum stage is inserted in place of the $N^{th}$ stage. Thus, the fast Hadamard transforms outputs are not computed, saving computation operations, reducing complexity and speeding up processing. Note that the find-maximum mechanism of the present invention may utilize any fast Hadamard transform elements including conventional radix-2 stages and the reduced complexity radix-4 FHT of the present invention.

In addition, a radix-4 based fast find-max mechanism is proposed requiring only N−2 conventional radix-2 FHT stages (or equivalents) and a single radix-4 find-max stage.

The reduced complexity radix-4 FHT is suitable for use in many digital signal processing applications and in particular is applicable to digital cellular communications systems such as CDMA wherein it can be used in both mobile to base and base to mobile transmissions. The radix-4 FHT of the present invention can be used to construct even order fast Hadamard transforms of any arbitrary order by cascading several radix-4 stages in series, where the FHT order is defined hereinabove. The invention can be used to construct odd order fast Hadamard transforms as well by adding a single radix-2 FHT stage to a plurality of radix-4 FHT stages. The radix-2 stage may be added via appending, prepending or other suitable placement.

Many aspects of the invention described herein may be constructed as software objects that execute in embedded devices as firmware, software objects that execute as part of a software application on either an embedded or non-embedded computer system running a real-time operating system such as WinCE, Symbian, OSE, Embedded LINUX, etc., or non-real time operating systems such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is therefore provided in accordance with the present invention a method of performing a radix-4 fast Hadamard transform, the method comprising the steps of calculating a quantity $\tilde{w}=w_0+w_1+w_2-w_3$ wherein $w_0$, $w_1$, $w_2$, $w_3$ comprise a first input, a second input, a third input and a fourth input of the radix-4 fast Hadamard transform, respectively and calculating the quantities $s_0=\tilde{w}+2w_3$, $s_1=\tilde{w}-2w_1$, $s_2=\tilde{w}-2w_2$, $s_3=\tilde{w}+2w_0$, wherein $s_0$, $s_1$, $s_2$, $s_3$ comprise a first output, a second output, a third output and a fourth output of the radix-4 fast Hadamard transform, respectively.

There is also provided in accordance with the present invention an apparatus for performing a reduced complexity radix-4 fast Hadamard transform comprising first calculating means for calculating a quantity $\tilde{w}=w_0+w_1+w_2-w_3$ wherein $w_0$, $w_1$, $w_2$, $w_3$ comprise first, second, third and fourth inputs of the radix-4 fast Hadamard transform, respectively and second calculating means for calculating a first fast Hadamard transform output in accordance with the equation $s_0=\tilde{w}+2w_3$, third calculating means for calculating a second fast Hadamard transform output in accordance with the equation $s_1=\tilde{w}-2w_1$, fourth calculating means for calculating a third fast Hadamard transform output in accordance with the equation $s_2=\tilde{w}-2w_2$ and fifth calculating means for calculating a fourth fast Hadamard transform output in accordance with the equation $s_3=-\tilde{w}+2w_0$.

There is further provided in accordance with the present invention a method of performing an even order fast Hadamard transform, the method comprising the steps of cascading in series one or more radix-4 fast Hadamard transform stages, each radix-4 fast Hadamard transform stage comprising one or more radix-4 fast Hadamard transform modules and each radix-4 fast Hadamard transform module adapted to perform the steps of calculating a quantity $\tilde{w}=w_0+w_1+w_2-w_3$ wherein $w_0$, $w_1$, $w_2$, $w_3$ comprise a first input, a second input, a third input and a fourth input of the radix-4 fast Hadamard transform, respectively and calculating the quantities $s_0=\tilde{w}+2w_3$, $s_1=\tilde{w}-2w_1$, $s_2=\tilde{w}-2w_2$, $s_3=-\tilde{w}+2w_0$, wherein $s_0$, $s_1$, $s_2$, $s_3$ comprise a first output, a second output, a third output and a fourth output of the radix-4 fast Hadamard transform, respectively.

There is also provided in accordance with the present invention a method of performing a fast Hadamard transform, the method comprising the steps of cascading in series one or more radix-4 fast Hadamard transform stages, each radix-4 fast Hadamard transform stage comprising one or more radix-4 fast Hadamard transform modules, adding a radix-2 fast Hadamard transform stage to the cascaded series of radix-4 fast Hadamard transforms and each radix-4 fast Hadamard transform module adapted to perform the steps of calculating a quantity $\tilde{w}=w_0+w_1+w_2-w_3$ wherein $w_0$, $w_1$, $w_2$, $w_3$ comprise a first input, a second input, a third input and a fourth input of the radix-4 fast Hadamard transform, respectively and calculating the quantities $s_0=\tilde{w}+2w_3$, $s_1=\tilde{w}-2w_1$, $s_2=\tilde{w}-2w_2$, $s_3=-\tilde{w}+2w_0$, wherein $s_0$, $s_1$, $s_2$, $s_3$ comprise a first output, a second output, a third output and a fourth output of the radix-4 fast Hadamard transform, respectively.

There is further provided in accordance with the present invention a method of determining a maximum value of a fast Hadamard transform, the method comprising the steps of calculating N–1 radix-2 equivalent stages of an N-stage fast Hadamard transform, wherein N is a positive integer, calculating a plurality of maximum pair values |a|+|b|, one for each pair (a,b) of inputs from the N–1$^{th}$ stage and determining the maximum value from the plurality of maximum pair values.

There is still further provided in accordance with the present invention a method of determining a maximum value of a fast Hadamard transform, the method comprising the steps of calculating N–2 stages of an N-stage fast Hadamard transform, wherein N is a positive integer, calculating a plurality of local maxima values, one for each quartet ($w_0$, $w_1$, $w_2$, $w_3$) of inputs from the N–2$^{nd}$ equivalent fast Hadamard transform stage in accordance with the following $$\max\{|\tilde{w}+2\max(w_3,-w_1,-w_2,-w_0)|,$$
$$|\tilde{w}+2\min(w_3,-w_1,-w_2,-w_0)|\}$$

wherein the quantity $\tilde{w}$ is given by $\tilde{w}=w_0+w_1+w_2-w_3$ and $w_0$, $w_1$, $w_2$, $w_3$ comprise a first input, a second input, a third input and a fourth input of a radix-4 fast Hadamard transform, respectively and determining the maximum value from the plurality of local maxima values.

There is also provided in accordance with the present invention a method of performing a fast Hadamard transform $H_{2^N}$ of order $M=2^N$, comprising the steps of performing $2^{N-2}$ $H_4$ fast Hadamard transforms on an input so as to generate a first intermediate result, permuting the first intermediate result to generate a first permuted result, performing four $H_{2^{N-2}}$ fast Hadamard transforms on the first permuted result to generate a second intermediate result and permuting the second intermediate result to generate a fast Hadamard transform output.

There is further provided in accordance with the present invention an apparatus for implementing a fast Hadamard transform $H_{2^N}$ of order $M=2^N$ comprising a first stage adapted to perform $2^{N-2}$ $H_4$ fast Hadamard transforms on an input so as to generate a first intermediate result, a first permutation stage adapted to permute the first intermediate result to generate a first permuted result, a second stage adapted to perform four $H_{2^{N-2}}$ fast Hadamard transforms on the first permuted result so as to generate a second intermediate result and a second permutation state adapted to permute the second intermediate result to generate a fast Hadamard transform output.

There is also provided in accordance with the present invention a computer program product for use in a computing device, the computer program product comprising a computer usable medium having computer readable program code means embodied in the medium for performing a radix-4 fast Hadamard transform, the computer program product comprising computer readable program code means for calculating a quantity $\tilde{w}=w_0+w_1+w_2-w_3$ wherein $w_0$, $w_1$, $w_2$, $w_3$ comprise a first input, a second input, a third input and a fourth input of the radix-4 fast Hadamard transform, respectively and computer readable program code means for calculating the quantities $s_0=\tilde{w}+2w_3$, $s_1=\tilde{w}-2w_1$, $s_2=\tilde{w}-2w_2$, $s_3=-\tilde{w}+2w_0$, wherein $s_0$, $s_1$, $s_2$, $s_3$ comprise a first output, a second output, a third output and a fourth output of the radix-4 fast Hadamard transform, respectively.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
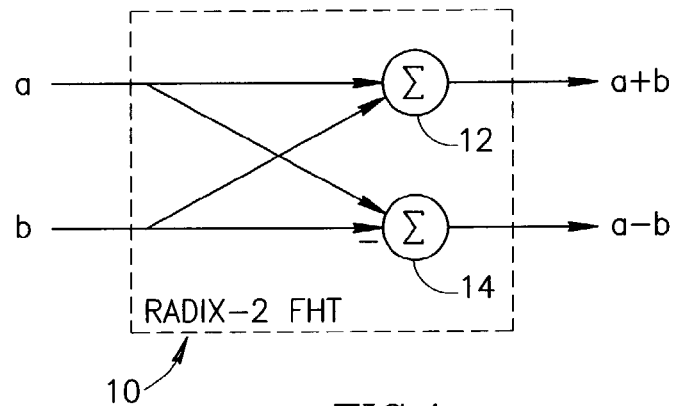
FIG. 1 is a block diagram illustrating a prior art radix-2 fast Hadamard transform butterfly structure.
Figure 2:
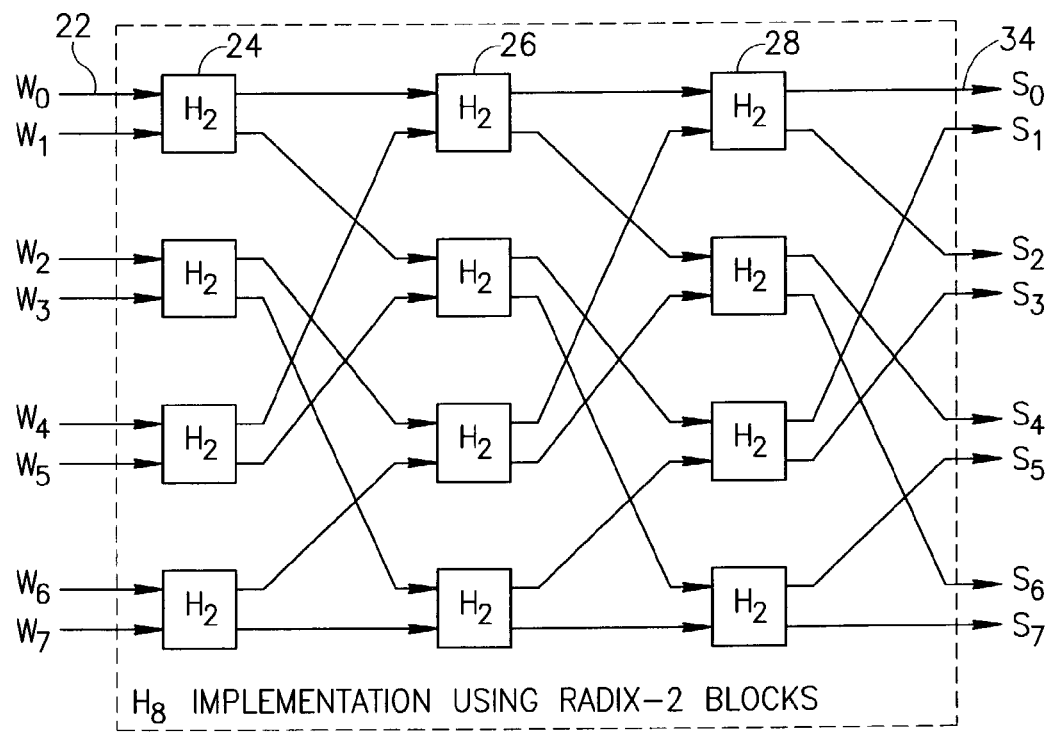
FIG. 2 is a block diagram illustrating a prior art radix-8 fast Hadamard transform structure constructed from three cascaded radix-2 fast Hadamard transform stages.
Figure 3:
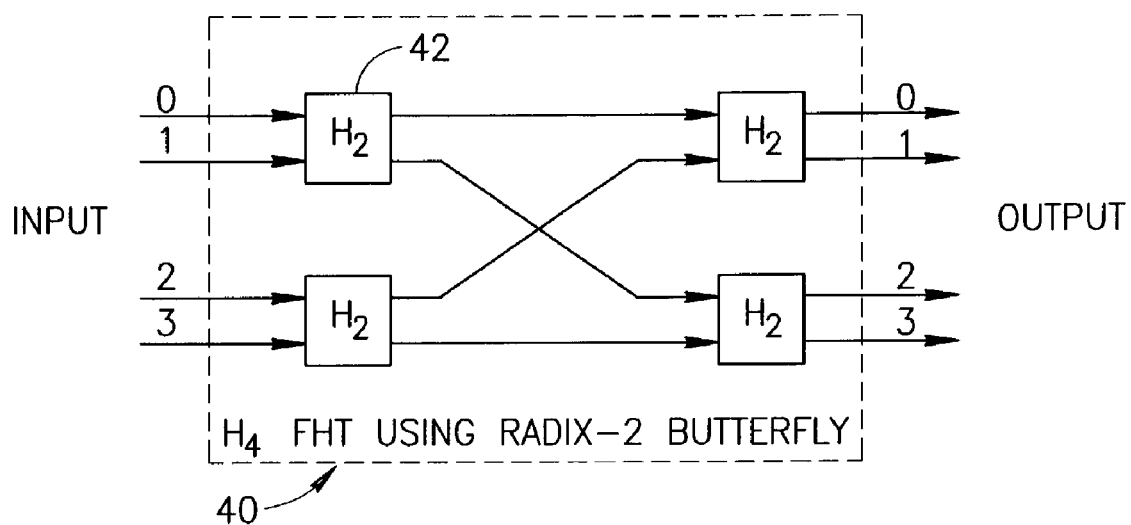
FIG. 3 is a block diagram illustrating a prior art radix-4 fast Hadamard transform structure constructed using radix-2 fast Hadamard transforms.

The following notation is used throughout this document.

| Term | Definition |
| --- | --- |
| ASIC | Application Specific Integrated Circuit |
| CDMA | Code Division Multiple Access |
| CPU | Central Processing Unit |
| DAT | Digital Audio Tape |
| DFT | Discrete Fourier Transform |
| DSP | Digital Signal Processor |
| DVD | Digital Versatile Disk |
| EEPROM | Electrically Erasable Programmable Read Only Memory |
| EEROM | Electrically Erasable Read Only Memory |
| EPROM | Electrically Programmable Read Only Memory |
| FFT | Fast Fourier Transform |
| FHT | Fast Hadamard Transform |
| FPGA | Field Programmable Gate Array |
| HDL | Hardware Description Language |
| IEEE | Institute of Electrical and Electronic Engineers |
| LAN | Local Area Network |
| LSB | Least Significant Bit |
| MSB | Most Significant Bit |
| NIC | Network Interface Card |
| PBX | Private Branch Exchange |
| PC | Personal Computer |
| PDA | Personal Digital Assistant |
| RAM | Random Access Memory |
| RF | Radio Frequency |
| ROM | Read Only Memory |
| UE | User Equipment |
| WAN | Wide Area Network |
| W-CDMA | Wideband Code Division Multiple Access |

DETAILED DESCRIPTION OF THE INVENTION

The present invention is a method and apparatus for performing a radix-4 fast Hadamard transform with reduced complexity. The invention also comprises a method and apparatus for directly determining the maximum output and index of a fast Hadamard transform based on either conventional radix-2 transforms or the radix-4 transform of the present invention. A methodology for implementing arbitrary size fast Hadamard transforms using radix-4 FHT modules is also presented.

The conventional approach to performing a fast Hadamard transform is to use the well-known radix-2 butterfly structure. In accordance with the present invention, a radix-4 structure is provided which enables the computational complexity to be lowered. A radix-4 FHT structure is described that utilizes only seven additions and multiplications by 2 which can be implemented at minimal to no cost depending on the actual processing platform used.

The invention also provides a mechanism to find the maximum value of a fast Hadamard transform and its corresponding index. In many applications it is not required to actually compute the outputs of the fast Hadamard transform but rather only to determine its maximal value and corresponding index. In accordance with the present invention, the first N−1 stages of a conventional N stage fast Hadamard transform are computed while a find-maximum stage is inserted in place of the $N^{th}$ stage. Thus, the fast Hadamard transforms outputs are not computed saving computation operations, reducing complexity and speeding up processing. Note that the find-maximum mechanism of the present invention may utilize any fast Hadamard transform elements including conventional radix-2 stages and the reduced complexity radix-4 FHT of the present invention.

In addition, the invention is not limited in the manner of implementation. One skilled in the electrical arts can construct the reduced complexity radix-4 FHT and the find-maximum mechanisms described herein in either hardware, software or a combination of hardware and software.

Reduced Complexity Radix-4 Fast Hadamard Transform

The Hadamard matrix of size $2^k$ can be written in the following way $$H_{2^k} = \underbrace{\begin{bmatrix} 1 & 1 \\ 1 & -1 \end{bmatrix} \otimes \begin{bmatrix} 1 & 1 \\ 1 & -1 \end{bmatrix} \otimes \begin{bmatrix} 1 & 1 \\ 1 & -1 \end{bmatrix} \otimes \ldots \otimes \begin{bmatrix} 1 & 1 \\ 1 & -1 \end{bmatrix}}_{k \text{ times}} \quad (8)$$

where $\hat{\times}$ represents the Kronecker product operation. This operation can be expressed in shortened notation as follows $$H_{2^k} = \underbrace{\begin{bmatrix} 1 & 1 \\ 1 & -1 \end{bmatrix}^{\otimes k}}_{k \text{ times}} \quad (9)$$

If we let m be even, the calculation of $H_{2^m} \cdot \underline{r}^T$, where the vector $\underline{r}$ represents a general input vector (e.g., received signal vector), can be performed using a series of Kronecker multiplications by $H_4$ as follows $$H_{2^m} \cdot \underline{r}^T = \underbrace{(H_2 \otimes H_2 \otimes \ldots \otimes H_2)}_{m \text{ times}} \cdot \underline{r}^T \quad (10)$$

$$= \underbrace{(H_4 \otimes H_4 \otimes \ldots \otimes H_4)}_{\frac{m}{2} \text{ times}} \cdot \underline{r}^T$$

$$= H_4^{\otimes \frac{m}{2}} \cdot \underline{r}^T$$

The calculation shown above in Equation 10 can be performed in m/2 radix-4 stages. Each stage comprises several computations of the multiplication of a vector by $H_4$. The complexity can be reduced by using the mechanism of the present invention as described infra.

In order to compute the FHT efficiently, $H_4$ is defined as follows in accordance with the present invention.

$$(s_0, s_1, s_2, s_3)^T = H_4 (w_0, w_1, w_2, w_3)^T \quad (11)$$

where the four inputs to the $H_4$ FHT are labeled $w_0, w_1, w_2, w_3$ and the four outputs are labeled $s_0, s_1, s_2, s_3$. The calculation of $H_4$ from the input $(w_0, w_1, w_2, w_3)$ to the output $(s_0, s_1, s_2, S_3)$ can be expressed in the following four equations $$s_0 = w_0 + w_1 + w_2 + w_3$$
$$s = w_0 - w_1 + w_2 - w_3$$
$$s_2 = w_0 + w_1 - w_2 - w_3$$
$$s_3 = w_0 - w_1 - w_2 + w_3 \quad (12)$$

The calculation of the four outputs using Equation 12 involves 12 operations. One way to reduce the number of computations is to perform four radix-2 FHT butterfly operations which reduce the computation of $H_4$ to 8 operations.

Assuming that multiplication by 2 is 'free' in terms of computing operations (which is the case for hardware implementations and most software ones as well), $H_4$ can be implemented in accordance with the present invention so as to reduce the number of computing operations to 7. First, the quantity $\tilde{w}$ is defined as $$\tilde{w}_0 + w_1 + w_2 - w_3 \quad (13)$$

The outputs are then calculated as follows $$s_0 = \tilde{w} + 2 \cdot w_3$$
$$s_1 = \tilde{w} - 2 \cdot w_1$$
$$s_2 = \tilde{w} - 2 \cdot w_2$$
$$s_3 = -\tilde{w} + 2 \cdot w_1 \quad (14)$$

In the case where the value of m is odd, the calculation of $H_{2^m} \cdot \underline{r}^T$ can be performed similarly as in the case of m being even using a series of Kronecker multiplications by $H_4$. In the odd case, however, an additional multiplication by $H_2$ is included as follows $$H_{2^m} \cdot \underline{r}^T = H_2^{\otimes m} \cdot \underline{r}^T = H_4^{\otimes \lfloor \frac{m}{2} \rfloor} \otimes H_2 \cdot \underline{r}^T = H_2 \otimes H_4^{\otimes \lfloor \frac{m}{2} \rfloor} \cdot \underline{r}^T \quad (15)$$

The construction of the reduced complexity radix-4 fast Hadamard transform will now be described in more detail. To aid in illustrating the principles of the present invention, the derivation of the transform is described in the context of the correlation of an input sequence consisting of a received signal to an $H_{16}$ matrix. The invention, however, is not intended to be limited to this example.

The calculation of the correlation involves computing the correlation of the input sequence $\underline{r}$ to the matrix $H_{16}$. According to fast Hadamard transform theory, $H_{16}$ can be written in the following manner $$H_{16} = H_4 \otimes H_4 \quad (16)$$
$$= H_2 \otimes H_2 \otimes H_2 \otimes H_2$$

where $H_2$ is given as above in Equation 2 and $H_4$ is given as above in Equation 4. Thus, $H_{16} \cdot \underline{r}^T$ can be written as $(H_4 \hat{\times} H_4) \cdot \underline{r}^T$. The Kronecker Lemma states that for any four square matrices A, B, C, D the following holds true $$(A \hat{\times} B) \cdot (C \hat{\times} D) = (A \cdot C) \hat{\times} (B \cdot D) \quad (17)$$

where $\hat{\times}$ is the Kronecker multiplication operation as explained supra and '·' is the conventional matrix multiplication operation. Using the Kronecker Lemma, $H_4 \hat{\times} H_4$ can be expressed as $$H_4 \otimes H_4 = (I_4 \cdot H_4) \otimes (H_4 \cdot I_4) \quad (18)$$
$$= (I_4 \otimes H_4) \cdot (H_4 \otimes I_4)$$

where $I_4$ is the 4×4 identity matrix.

From Equation 10 we begin with $$\underline{t}^T = (H_4 \otimes I_4) \cdot \underline{r}^T \quad (19)$$

$$= \begin{bmatrix} H_4 & 0 & 0 & 0 \\ 0 & H_4 & 0 & 0 \\ 0 & 0 & H_4 & 0 \\ 0 & 0 & 0 & H_4 \end{bmatrix} \cdot \underline{r}^T$$

We then calculate the correlation output as follows $$CorrelationOut = (I_4 \otimes H_4) \cdot \underline{t}^T \quad (20)$$

$$= \begin{bmatrix} I_4 & I_4 & I_4 & I_4 \\ I_4 & -I_4 & I_4 & -I_4 \\ I_4 & I_4 & -I_4 & -I_4 \\ I_4 & -I_4 & -I_4 & I_4 \end{bmatrix} \cdot \underline{t}^T$$

Figure 4:
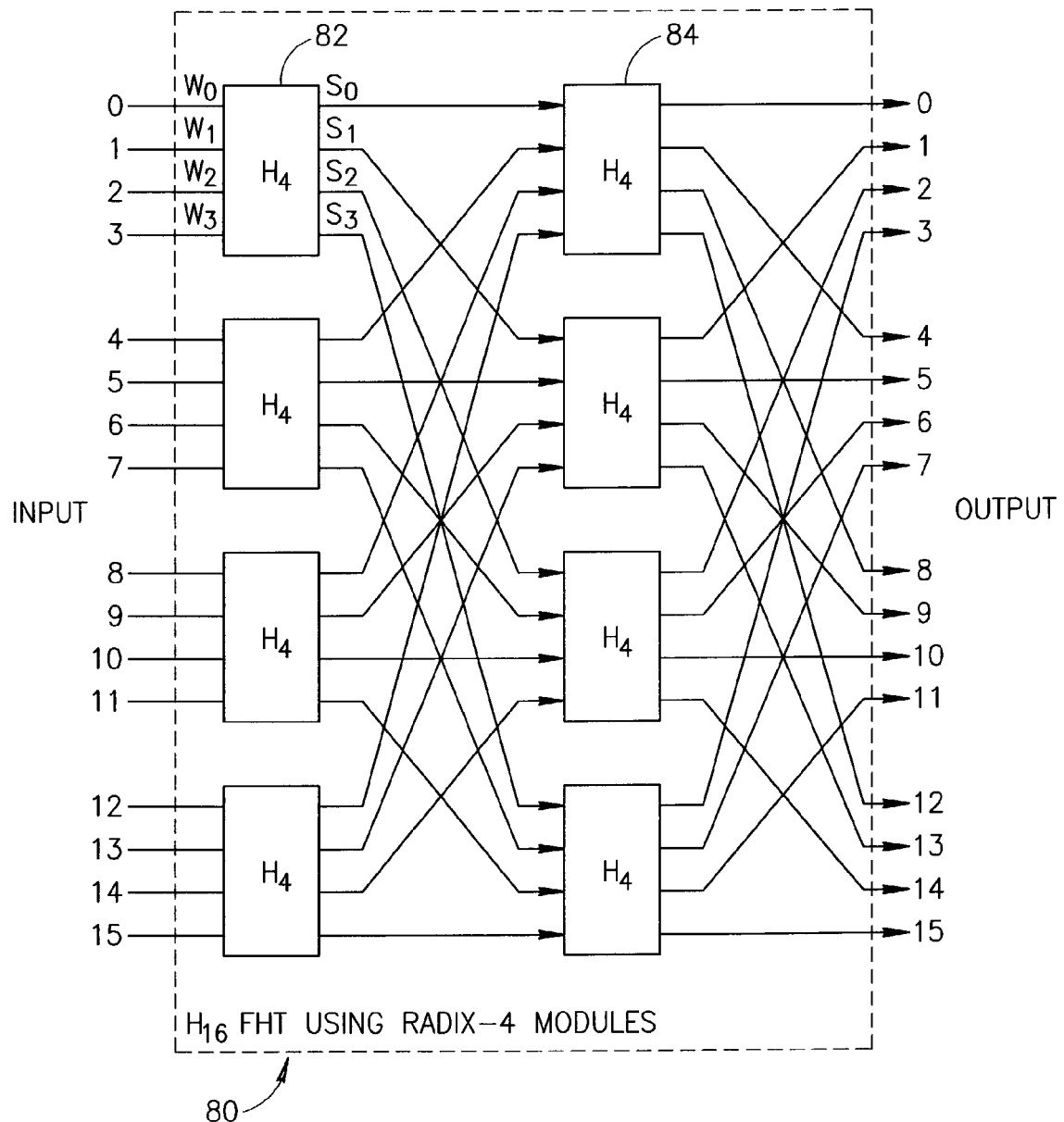
FIG. 4 is a block diagram illustrating an example radix-16 fast Hadamard transform constructed using the radix-4 fast Hadamard transform module of the present invention.

Applying a transformation on the input to the second stage, the structure of the $H_{16}$ is as shown in FIG. 4 which illustrates an example 16-point fast Hadamard transform constructed using the radix-4 fast Hadamard transform module of the present invention. The transform, generally referenced 80, comprises 8 radix-4 FHT modules organized in 2 stages 82, 84 of four each to cover 16 inputs and to generate 16 outputs. Note that a similar development to the one presented above can be made for any value of m. The input is represented by $\underline{r}$ while the output of the first radix-4 stage is represented by the expression in Equation 19. The output is represented by the expression in Equation 20 whereby permutations are applied to the outputs, as described in more detail in the following section.

Permutation Matrix/FHT Block Interconnection

In developing the radix-16 FHT using radix-4 blocks described supra, Equation 20 describes the radix-16 FHT output as a function of the intermediate results after a single radix-4 FHT block. If the matrix $(I_4 \hat{\times} H_4)$ is expanded to it's full size, we obtain the following $$CorrelationOut = \begin{bmatrix} 1 & 0 & 0 & 0 & 1 & 0 & 0 & 0 & 1 & 0 & 0 & 0 & 1 & 0 & 0 & 0 \\ 0 & 1 & 0 & 0 & 0 & 1 & 0 & 0 & 0 & 1 & 0 & 0 & 0 & 1 & 0 & 0 \\ 0 & 0 & 1 & 0 & 0 & 0 & 1 & 0 & 0 & 0 & 1 & 0 & 0 & 0 & 1 & 0 \\ 0 & 0 & 0 & 1 & 0 & 0 & 0 & 1 & 0 & 0 & 0 & 1 & 0 & 0 & 0 & 1 \\ 1 & 0 & 0 & 0 & -1 & 0 & 0 & 0 & 1 & 0 & 0 & 0 & -1 & 0 & 0 & 0 \\ 0 & 1 & 0 & 0 & 0 & -1 & 0 & 0 & 0 & 1 & 0 & 0 & 0 & -1 & 0 & 0 \\ 0 & 0 & 1 & 0 & 0 & 0 & -1 & 0 & 0 & 0 & 1 & 0 & 0 & 0 & -1 & 0 \\ 0 & 0 & 0 & 1 & 0 & 0 & 0 & -1 & 0 & 0 & 0 & 1 & 0 & 0 & 0 & -1 \\ 1 & 0 & 0 & 0 & 1 & 0 & 0 & 0 & -1 & 0 & 0 & 0 & -1 & 0 & 0 & 0 \\ 0 & 1 & 0 & 0 & 0 & 1 & 0 & 0 & 0 & -1 & 0 & 0 & 0 & -1 & 0 & 0 \\ 0 & 0 & 1 & 0 & 0 & 0 & 1 & 0 & 0 & 0 & -1 & 0 & 0 & 0 & -1 & 0 \\ 0 & 0 & 0 & 1 & 0 & 0 & 0 & 1 & 0 & 0 & 0 & -1 & 0 & 0 & 0 & -1 \\ 1 & 0 & 0 & 0 & -1 & 0 & 0 & 0 & -1 & 0 & 0 & 0 & 1 & 0 & 0 & 0 \\ 0 & 1 & 0 & 0 & 0 & -1 & 0 & 0 & 0 & -1 & 0 & 0 & 0 & 1 & 0 & 0 \\ 0 & 0 & 1 & 0 & 0 & 0 & -1 & 0 & 0 & 0 & -1 & 0 & 0 & 0 & 1 & 0 \\ 0 & 0 & 0 & 1 & 0 & 0 & 0 & -1 & 0 & 0 & 0 & -1 & 0 & 0 & 0 & 1 \end{bmatrix} t \quad (21)$$

Row and column permutations are applied to permit the utilization of radix-4 FHT modules. As a result of the permutations, a structure similar to that shown in Equation 19 is obtained as follows $$\begin{bmatrix} c_0 \\ c_4 \\ c_8 \\ c_{12} \\ c_1 \\ c_5 \\ c_9 \\ c_{13} \\ c_2 \\ c_6 \\ c_{10} \\ c_{14} \\ c_3 \\ c_7 \\ c_{11} \\ c_{15} \end{bmatrix} = \begin{bmatrix} H_4 & 0 & 0 & 0 \\ 0 & H_4 & 0 & 0 \\ 0 & 0 & H_4 & 0 \\ 0 & 0 & 0 & H_4 \end{bmatrix} \begin{bmatrix} t_0 \\ t_4 \\ t_8 \\ t_{12} \\ t_1 \\ t_5 \\ t_9 \\ t_{13} \\ t_2 \\ t_6 \\ t_{10} \\ t_{14} \\ t_3 \\ t_7 \\ t_{11} \\ t_{15} \end{bmatrix} \quad (22)$$

Thus, the output of each Radix-4 FHT column in a Radix-16 FHT implementation must be permutated accordingly in order to achieve the correct result. In particular, the following permutations are performed

| Input Index | Output Index | Input Index | Output Index |
|---|---|---|---|
| 0 | 0 | 2 | 8 |
| 4 | 1 | 6 | 9 |
| 8 | 2 | 10 | 10 |
| 12 | 3 | 14 | 11 |
| 1 | 4 | 3 | 12 |
| 5 | 5 | 7 | 13 |
| 9 | 6 | 11 | 14 |
| 13 | 7 | 15 | 15 |

Note that these premutations are somewhat similar to those used when applying radix-2 based FHT blocks to implement a higher-order FHT.

To implement a radix $2^N$ FHT, the FHT is written as $(I_4 \hat{\times} H_{2^{N-2}})(H_4 \hat{\times} I_{2^{N-2}})$, which is implemented as a column of $2^{N-2}$ radix-4 FHT blocks with the outputs permuted in increments of 4, followed by a column of four radix $2^{N-2}$ FHT blocks with outputs permuted as required in increments of 4 to generate the input to the next block. The radix $2^{N-2}$ FHT blocks can in turn be inplemented, using the same methodology, by a column of radix-4 FHT blocks, and a column of radix $2^{N-4}$ blocks, etc., as described infra. Note that for even N, radix-4 FHT blocks only are used. For odd N, one or more radix-4 FHT blocks are used with one stage made up of radix-2 FHT blocks having permuted outputs. In the case wherein the base FHT block is not radix-4, the input/output permutations would then be in increments of the particular radix.

Implementation of Radix-$2^N$ Fast Hadamard Transform

Figure 5:
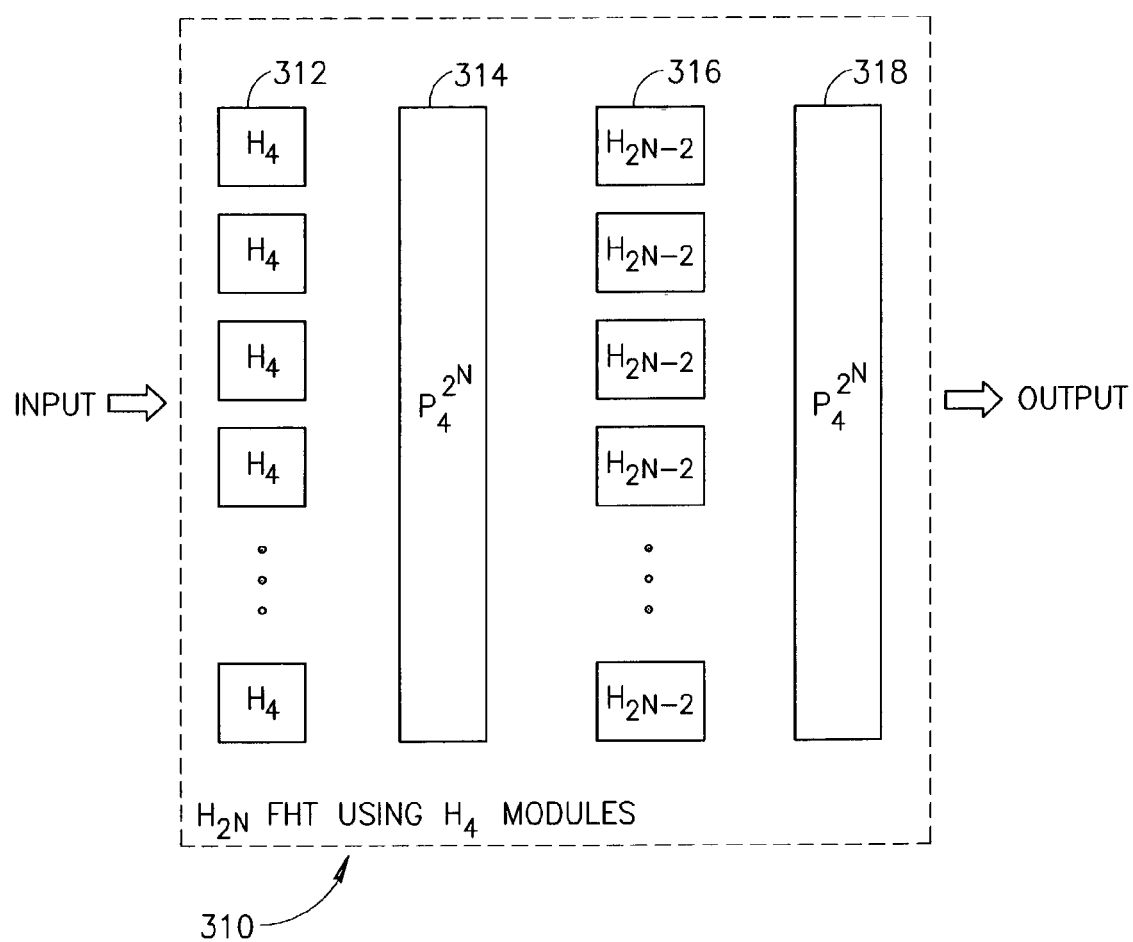
FIG. 5 is a block diagram illustrating radix-$2^N$ fast Hadamard transform using radix-4 fast Hadamard transform modules.

The present invention provides a methodology to implement fast Hadamard transforms of any order $2^N$ for cases where N is even or odd. As stated above, in order to implement $H_{2^N}$, the expression for the transform is written as $$(I_4 \hat{\times} H_{2^{N-2}})(H_4 \hat{\times} I_{2^{N-2}}) \quad (23)$$

which maps to a column of $2^{N-2}$ fast Hadamard transform blocks followed by the implementation of $(I_4 \hat{\times} H_{2^{N-2}})$ as shown in FIG. 5. To optimize the use of the reduced complexity radix-4 fast Hadamard transform module of the present invention, it is desirable to implement the $(I_4 \hat{\times} H_{2^{N-2}})$ block using $H_4$ FHT blocks. This can be achieved by applying input and output permutations resulting in the following structure $$P_4^{2^N}(H_{2^{N-2}} \hat{\times} I_4) P_4^{2^N}(H_4 \hat{\times} I_{2^{N-2}}) \quad (24)$$

The permutation $P_4^M$, where $M = 2^N$, is a permutation matrix of size M constructed in increments of 4. Specifically, the permutation is constructed such that input 0 is connected to output 0, input 1 to output 4, input 2 to output 8, input 3 to output 12, etc., until no additional outputs remain corresponding to output M-4. Connection is then made to the next available output, i.e. 1 and then continues with output 5, 9, 13, . . . , M-3, wrapping around to output 2, 6, 10, . . . , M-2, wrapping around to output 3, 7, 11, . . . M-1. To illustrate, the outputs of both $H_4$ FHT stages of the $H_{16}$ in FIG. 4 have permutations applied in this manner.

With reference to FIG. 5 and Equation 24, the FHT, generally referenced 310, comprises a first FHT stage 312 comprising $2^{N-2}$ $H_4$ blocks followed by permutation $P_4^{2^N}$ 314. The permuted outputs of the first stage are then input to a second stage 316 comprising four $H_{2^{N-2}}$ FHT blocks. The outputs of the second stage are input to the $P_4^{2^N}$ permutation 318 and subsequently output therefrom. Depending on the order N, the second stage may be implemented using $H_4$ FHTs or FHTs having a different radix.

It is important to note that Equation 24 can be calculated recursively to implement a fast Hadamard transform $H_{2^N}$ having any value N. The same methodology described above can be used to implement $H_{2^{N-2}}$ using $H_4$ FHT blocks. From the expression in Equation 24, another $H_4$ column can be implemented resulting in $$P_4^{2^N}((P_4^{2^{N-2}}(H_{2^{N-4}}\hat{x}I_4)P_4^{2^{N-2}}(H_4\hat{x}I_{2^{N-4}}))\hat{x}I_4)P_4^{2^N}(H_4\hat{x}I_{2^{N-2}}) \quad (25)$$

This expression represents an expanded version of Equation 24 which, for N=6 (i.e. $H_{64}$), shows an implementation using $H_4$ blocks exclusively.

Alternatively, the recursion tree in Equation 3 can be implemented in a logarithmic manner. To illustrate, consider the case of N=8 corresponding to a radix-256 fast Hadamard transform. Utilizing Equations 10, 16 and 17 the following can be written $$\begin{aligned}H_{2^8} &= H_{2^4} \otimes H_{2^4} \\ &= (I_{16} \otimes H_{16})(H_{16} \otimes I_{16}) \\ &= P_{16}^{256}(H_{16} \otimes I_{16})P_{16}^{256}(H_{16} \otimes I_{16}) \\ &= P_{16}^{256}((P_4^{16}(H_4 \otimes I_4)P_4^{16}(H_4 \otimes I_4)) \otimes I_{16})P_{16}^{256}((P_4^{16}(H_4 \otimes I_4)P_4^{16}(H_4 \otimes I_4)) \otimes I_{16})\end{aligned} \quad (26)$$

Figure 6:
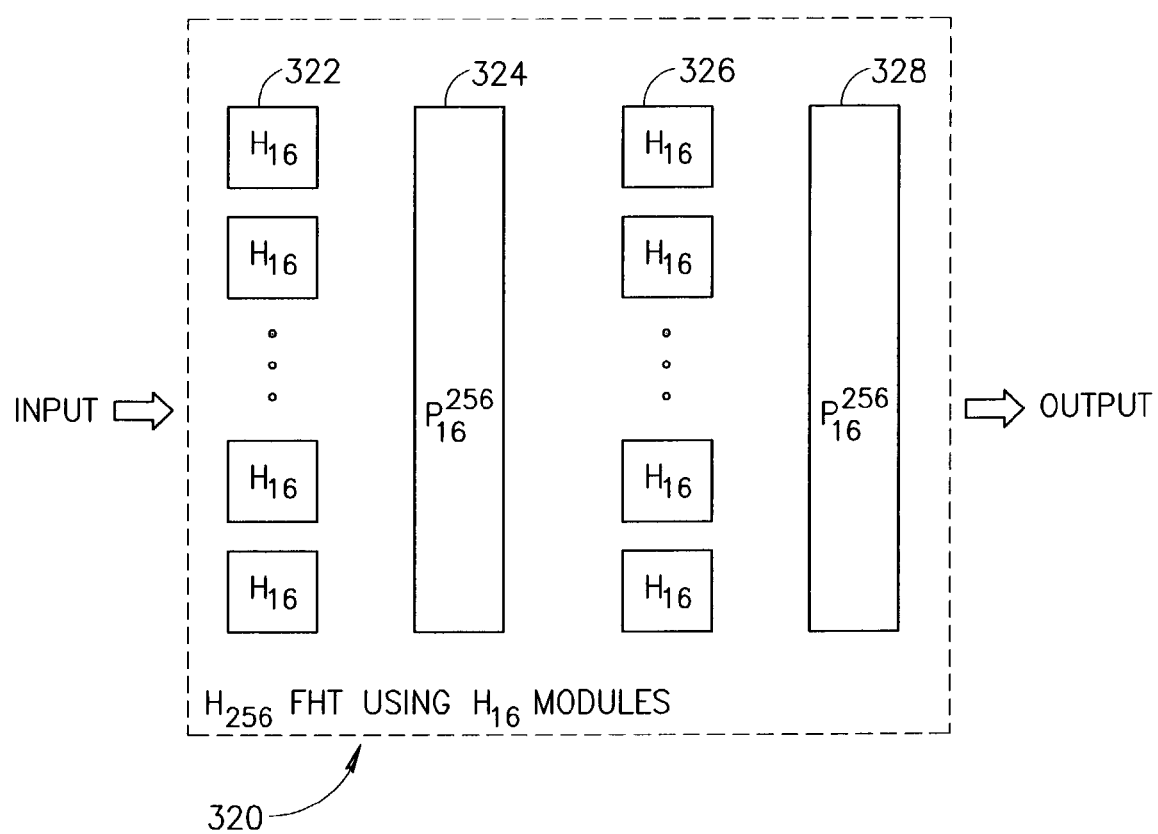
FIG. 6 is a block diagram illustrating an example implementation of a radix-256 (N=8) fast Hadamard transform using $H_{16}$ fast Hadamard transform modules.

An example implementation of a radix-256 (N=8) fast Hadamard transform using $H_{16}$ fast Hadamard transform modules is shown in FIG. 6. The radix-256 FHT, generally referenced 320, comprises a first FHT stage 322 comprising 16 $H_{16}$ blocks followed by output permutation 324. The permuted outputs of the first stage are input to a second FHT stage 326 comprising 16 $H_{16}$ blocks whose outputs are permuted by permutation $P_{16}^{256}$ block 328 to produce the overall radix-256 FHT outputs. It is appreciated by one skilled in the art that FHTs having any desired order can be implemented using the methodology of the invention.

Reduced Complexity Radix-4 Fast Hadamard Transform

Figure 7:
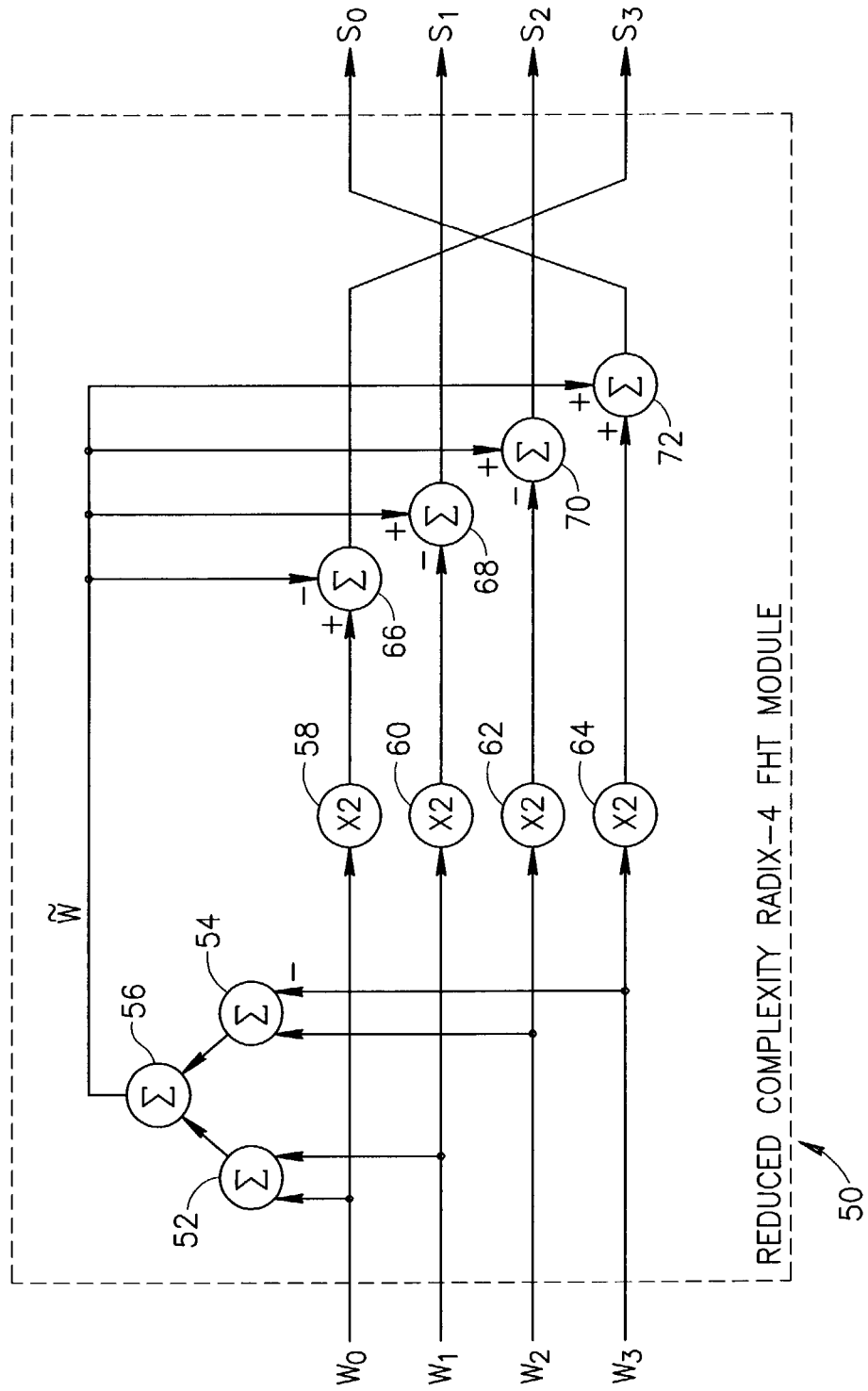
FIG. 7 is a block diagram illustrating an embodiment of the reduced complexity radix-4 fast Hadamard transform module constructed in accordance with the present invention.

A block diagram illustrating an embodiment of the reduced complexity radix-4 fast Hadamard transform module constructed in accordance with the present invention is shown in FIG. 7. The FHT module, generally referenced 50, is adapted to implement the expressions for the output of the radix-4 FHT in Equations 13 and 14. The quantity $\tilde{w}$ is calculated from the inputs using three adders 52, 54, 56. The $s_0$ output is generated by summing the output of shifter 64 with $\tilde{w}$ via adder 72. The $s_1$ output is generated by subtracting the output of shifter 60 from $\tilde{w}$ via adder 68. The $s_2$ output is generated by subtracting the output of shifter 62 from $\tilde{w}$ via adder 70. The $s_3$ output is generated by subtracting the output of shifter 58 from $\tilde{w}$ via adder 66.

Thus, the radix-4 FHT of the present invention is operative to reduce the number of operations by 12.5%. Depending on the application, this can provide significant savings in time and complexity. For example, the number of operations required by the $H_{16}$ transform using the radix-4 FHT of the present invention is reduced to 7×8=56 operations resulting in significant savings.

In accordance with the invention, the radix-4 FHT module may be used to construct fast Hadamard transforms having an even or odd radix. For an even radix, a number of radix-4 FHT module stages are cascaded together to form larger size transforms, such as shown in FIG. 4 described supra. For odd radix transforms, a radix-2 FHT stage is cascaded with one or more radix-4 FHT stages.

Figure 8:
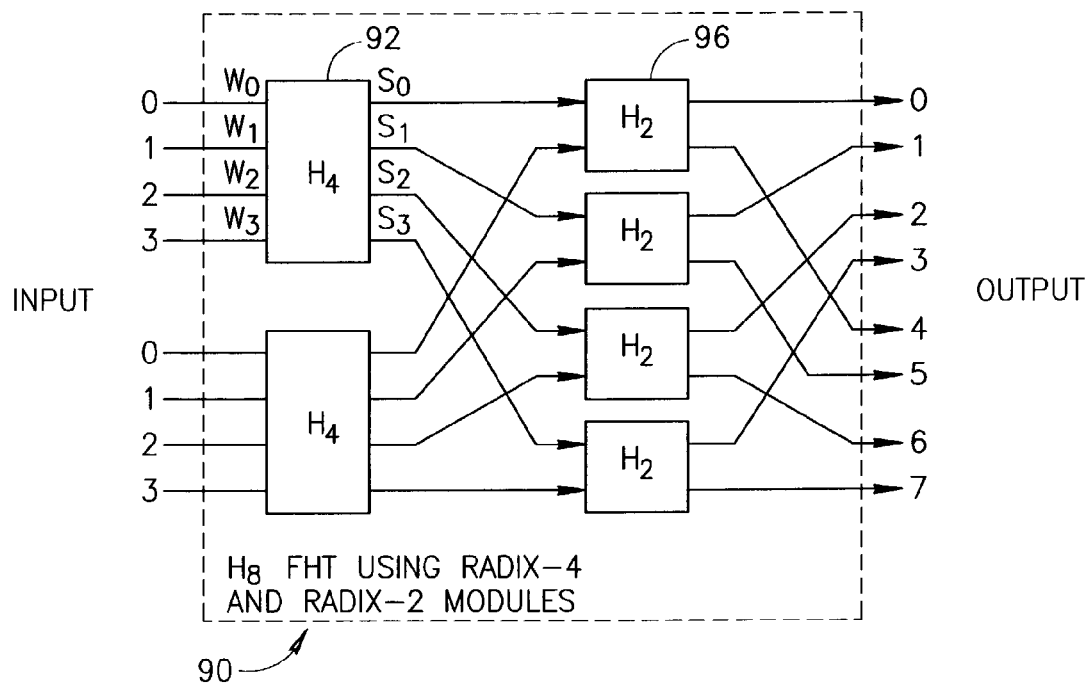
FIG. 8 is a block diagram illustrating an example $H_8$ fast Hadamard transform constructed using the radix-4 fast Hadamard transform modules of the present invention and radix-2 fast Hadamard transform modules.

A block diagram illustrating an example 8-point fast Hadamard transform constructed using the radix-4 fast Hadamard transform modules of the present invention and radix-2 fast Hadamard transform modules is shown in FIG. 8. The $H_8$ FHT, generally referenced 90, is constructed from a first stage comprising radix-4 FHT modules 92 of the present invention followed by a second stage comprising radix-2 FHT modules 96. This is the case where N=3 is odd. In general, for odd N, one or more radix-4 stages are followed by a final stage comprising radix-2 FHTs. For the case where N is even, only radix-4 stages are used. It is important to note that the radix-2 stage may be placed anywhere without affecting the output.

Fast Find Maximum Mechanism

The present invention also provides a mechanism to determine the maximum of a fast Hadamard transform that does not require the actual outputs to be computed. Many applications do not require the actual outputs but instead only require the maximum value and its index to be found. In accordance with the mechanism, the first N−1 stages of an N-stage FHT are computed. The outputs of the N−1$^{st}$ stage are then input to a maximum-finding stage without requiring all the outputs of the FHT to be computed.

The find-max mechanism of the invention is based on the following premise.

$$\max\{|a+b|,|a-b|\}=|a|+|b| \quad (27)$$

It is noted that the radix-2 FHT is operative to generate the output (a+b,a−b) from the two inputs (a,b). Therefore, the last radix-2 stage can be replaced by first finding for each pair the maximum value |a|+|b| then finding the maximum of all pair maximums. The output index is computed from the index of the maximum pair maximum and the two inputs that generated it.

Figure 9:
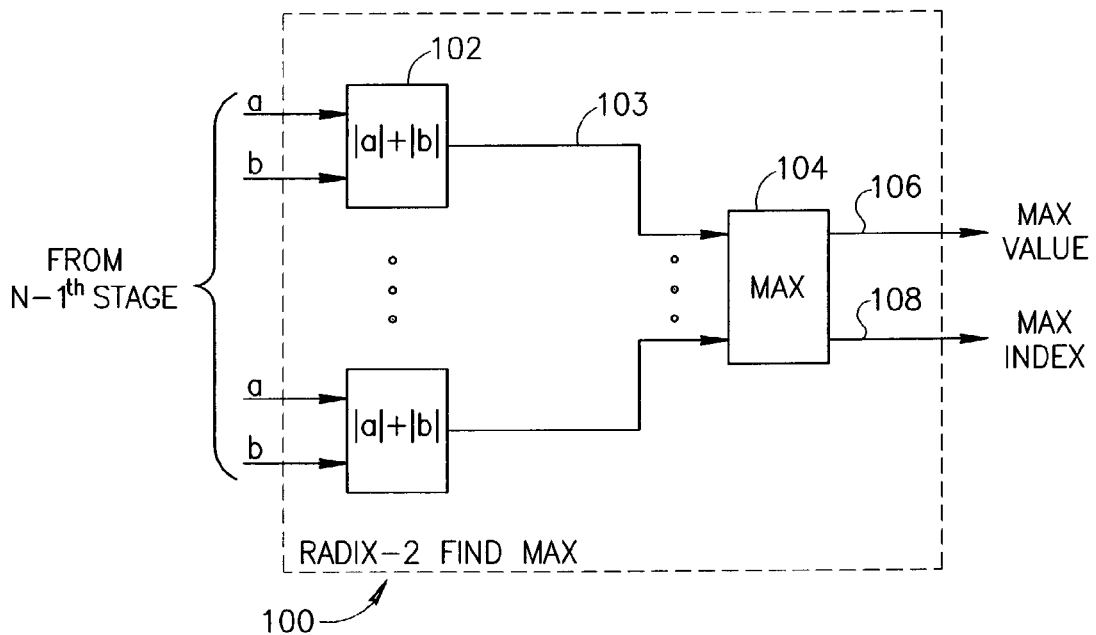
FIG. 9 is a block diagram illustrating an embodiment of the radix-2 find maximum module constructed in accordance with the present invention.

A block diagram illustrating an embodiment of the radix-2 find maximum module constructed in accordance with the present invention is shown in FIG. 9. The module, generally referenced 100, comprises a plurality of pair maximum elements 102 adapted to generate the maximum of its a and b inputs. The inputs to the find-max module comprise the outputs of the N−1$^{th}$ stage of the FHT. Any number of pair maximum elements may be used in accordance with the particular application. The outputs 103 of each of the pair maximum elements are input to a maximum determination element 104 that is operative to generate the maximum value 106 and to determine its corresponding index 108.

Figure 10:
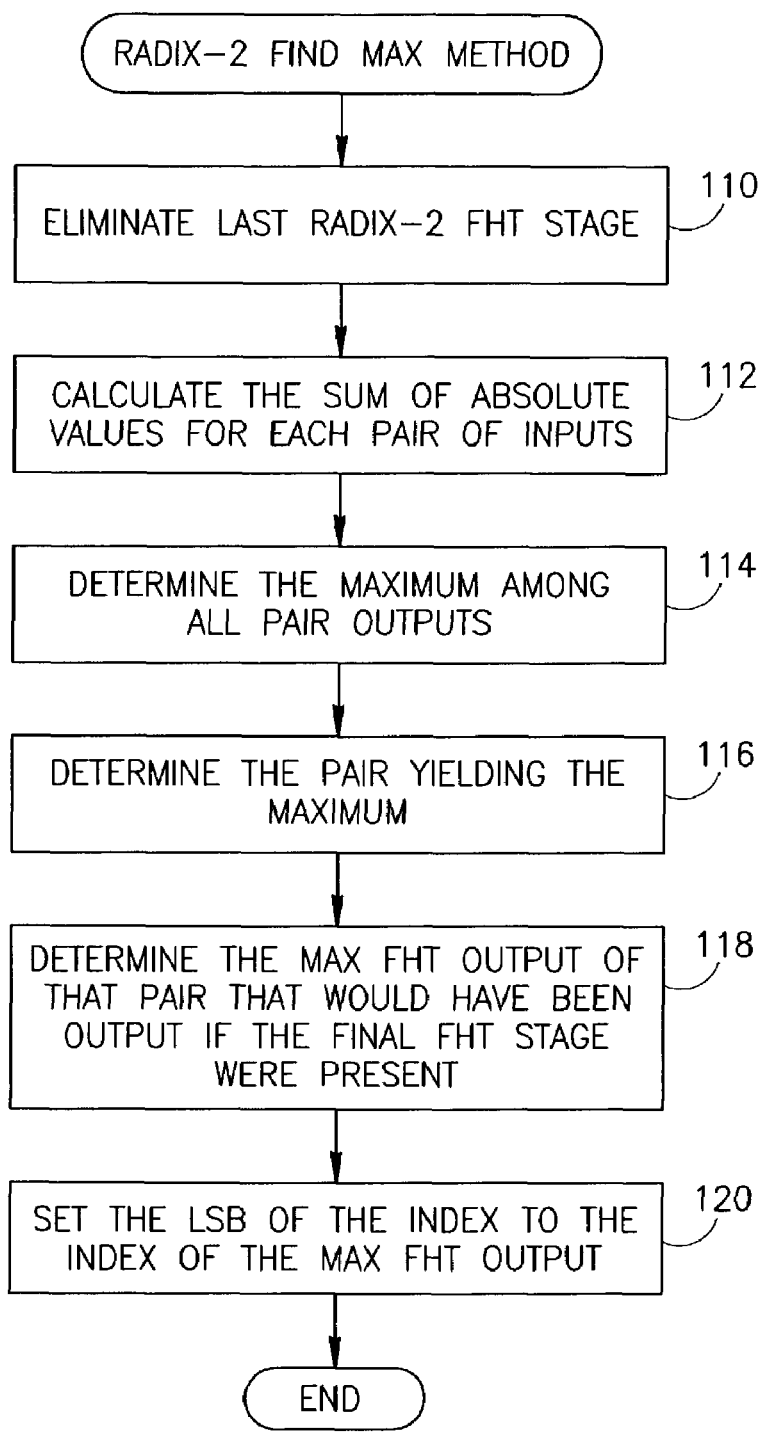
FIG. 10 is a flow diagram illustrating the method of the radix-2 find maximum module of the present invention.

A flow diagram illustrating the method of the radix-2 find maximum module of the present invention is shown in FIG. 10. Beginning with an N-stage FHT, the last radix-2 stage is eliminated and replaced with the find-max mechanism of the invention (step 110). The sum of the absolute values of each pair of inputs a, b are calculated (step 112). The maximum is then determined from among all the pair maximums calculated (step 114). In order to determine the index, the pair of inputs that yielded the maximum is then determined (step 116). This provides the N−1 MSBs of the index. The max FHT output of this pair of outputs that would have been generated if the final FHT stage were present are determined (step 118). The LSB of the index is then set to the index of the max FHT output generated (step 120).

Figure 11:
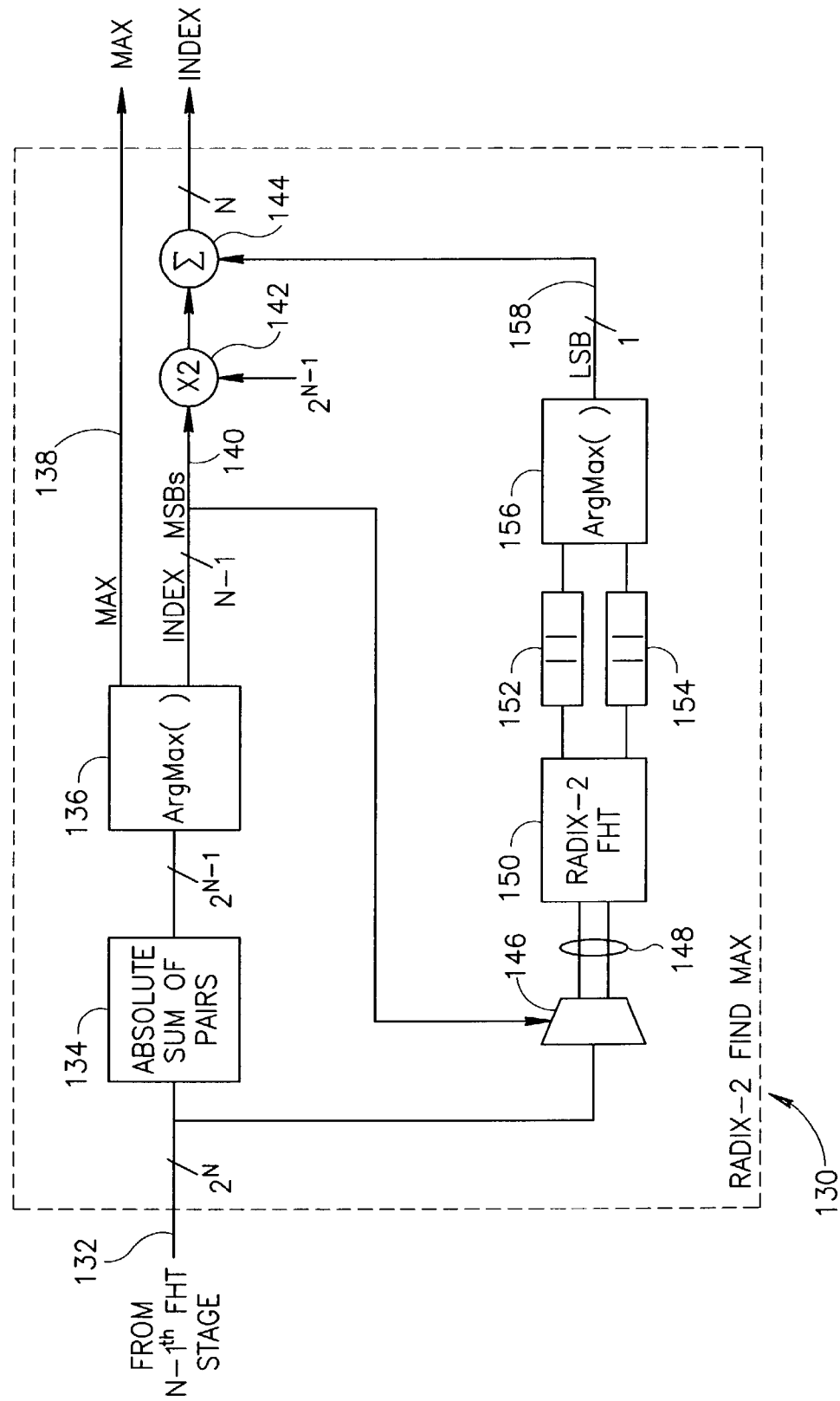
FIG. 11 is a block diagram illustrating the radix-2 find maximum mechanism in more detail.

A block diagram illustrating an example implementation of the radix-2 find maximum module of FIG. 9 in more detail is shown in FIG. 11. The find-max mechanism, generally referenced 130, comprises several processing blocks operative to find the maximum and its associated index. The maximum is determined by blocks 134, 136. Block 136 also functions to determine the MSBs of the index while the remaining blocks function to determine the LSB.

The $2^N$ outputs from the N−1$^{th}$ stage of the FHT comprise the input 132 to the find-max module. The sum of the absolute values of each pair of inputs is computed by block 134 to generate $2^{N-1}$ pair maximums. The argmax( ) block 136 functions to determine the maximum value 138 from the $2^{N-1}$ pair maximums input to it. In addition, the N−1 MSBs 140 of the index are obtained by determining which pair of inputs yielded the maximum value 138.

To find the LSB of the index, the $2^N$ outputs from the N−1$^{th}$ stage are input to multiplexer 146 adapted to input a plurality of pairs of values and select one of the pairs for output. The multiplexer, being controlled by the MSBs, is operative to output the two inputs 148 that yielded the maximum. Although the maximum value is known, it is not known whether the sum or difference of the inputs would generate it. Thus, a radix-2 FHT 150 is performed on the two values and their absolute values taken via blocks 152, 154. The maximum of the two is then determined via block 156. The index of the maximum makes up the LSB 158 of the index. The MSBs are shifted one bit via multiplier 142 and combined via adder 144 with the LSB to generate the final index.

Note that it is possible to replace the radix-2 FHT block 150, absolute value blocks 152 and the argmax( ) block 156 by checking the sign of the signals at the output of the multiplexer 146. If the two signals have the same sign, it is obvious that the sum would generate the maxima and the LSB signal 158 is set to 0, otherwise it is set to 1. Using this alternative scheme, the input to multiplexer 146 may comprise only the sign bits of the input signals 132.

Figure 12:
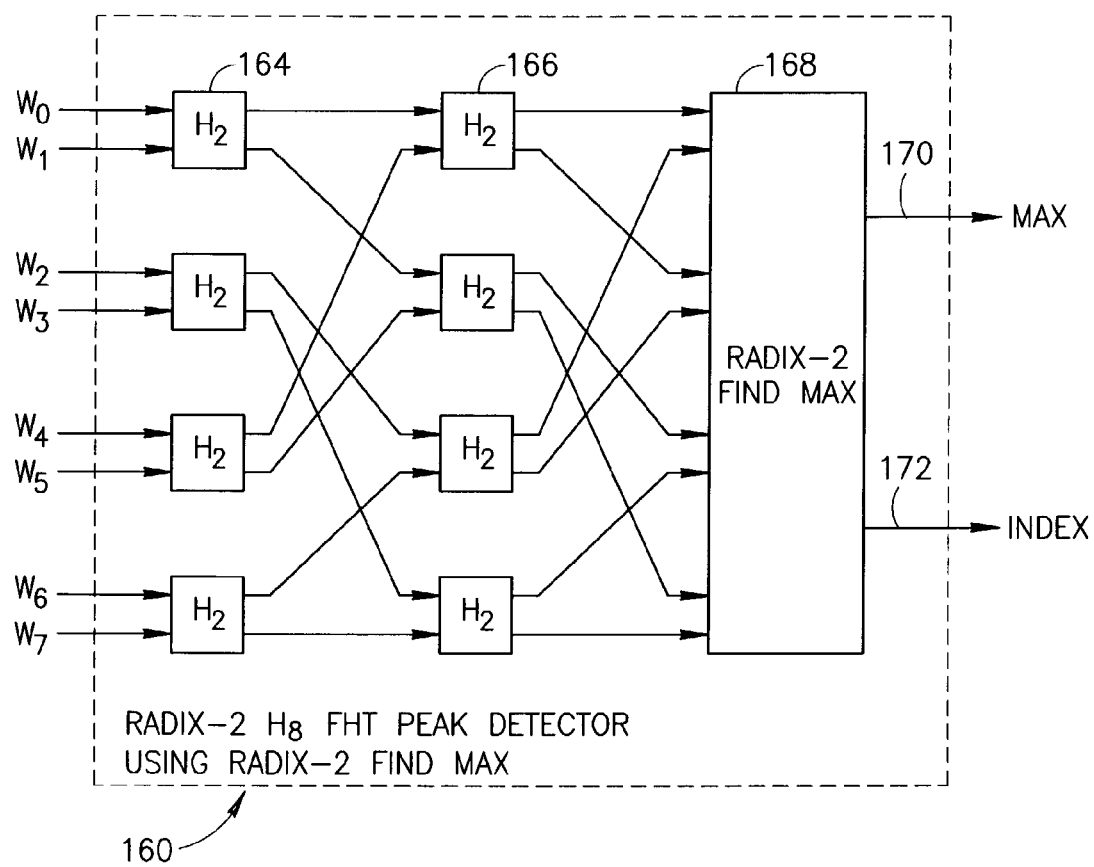
FIG. 12 is a block diagram illustrating the application of the radix-2 find maximum method of the present invention to a $H_8$ fast Hadamard transform peak detector.

A block diagram illustrating the application of the radix-2 find-max scheme of the present invention to an 8-point fast Hadamard transform peak detector is shown in FIG. 12. The radix-2 H$_8$ FHT peak detector module, generally referenced 160, comprises two radix-2 FHT stages 164, 166 followed by a radix-2 find-max module 168 of the present invention. In accordance with the invention, the 3$^{rd}$ radix-2 FHT stage is replaced with the find-max module, which is operative to generate the maximum value 170 and its corresponding index 172. Thus, using the find-max module of the present invention, the last radix-2 FHT stage is not required.

In addition to the radix-2 find-max mechanism described above, the invention also provides a radix-4 find-max mechanism as well. The radix 4 find-maximum is given as follows $$\max\{|s_0|, |s_1|, |s_2|, |s_3|\} = \max\{|s_0|, |s_1|, |s_2|, |-s_3|\} \quad (28)$$

$$= \max\left\{ \begin{array}{l} |\tilde{w} + 2\max(w_3, -w_1, -w_2, -w_0)|, \\ |\tilde{w} + 2\min(w_3, -w_1, -w_2, -w_0)| \end{array} \right\}$$

or equivalent where $w_0, w_1, w_2, w_3$ comprise the inputs to the H$_4$ FHT, $s_0, s_1, s_2, s_3$ comprise the outputs and the quantity $\tilde{w}$ is calculated from the inputs using Equation 13 above. In this case, $2^{N-2}$ values are input to an argmax( ) function to generate the N−2 MSBs. The two LSBs are determined using a find-max operation for a radix-4 FHT wherein the inputs are selected using the generated N−2 MSB bits. Note that alternatively, the max and min terms may be replaced by min and max terms since the two are equivalent as $\max\{x\}=-\min\{-x\}$.

Figure 13:
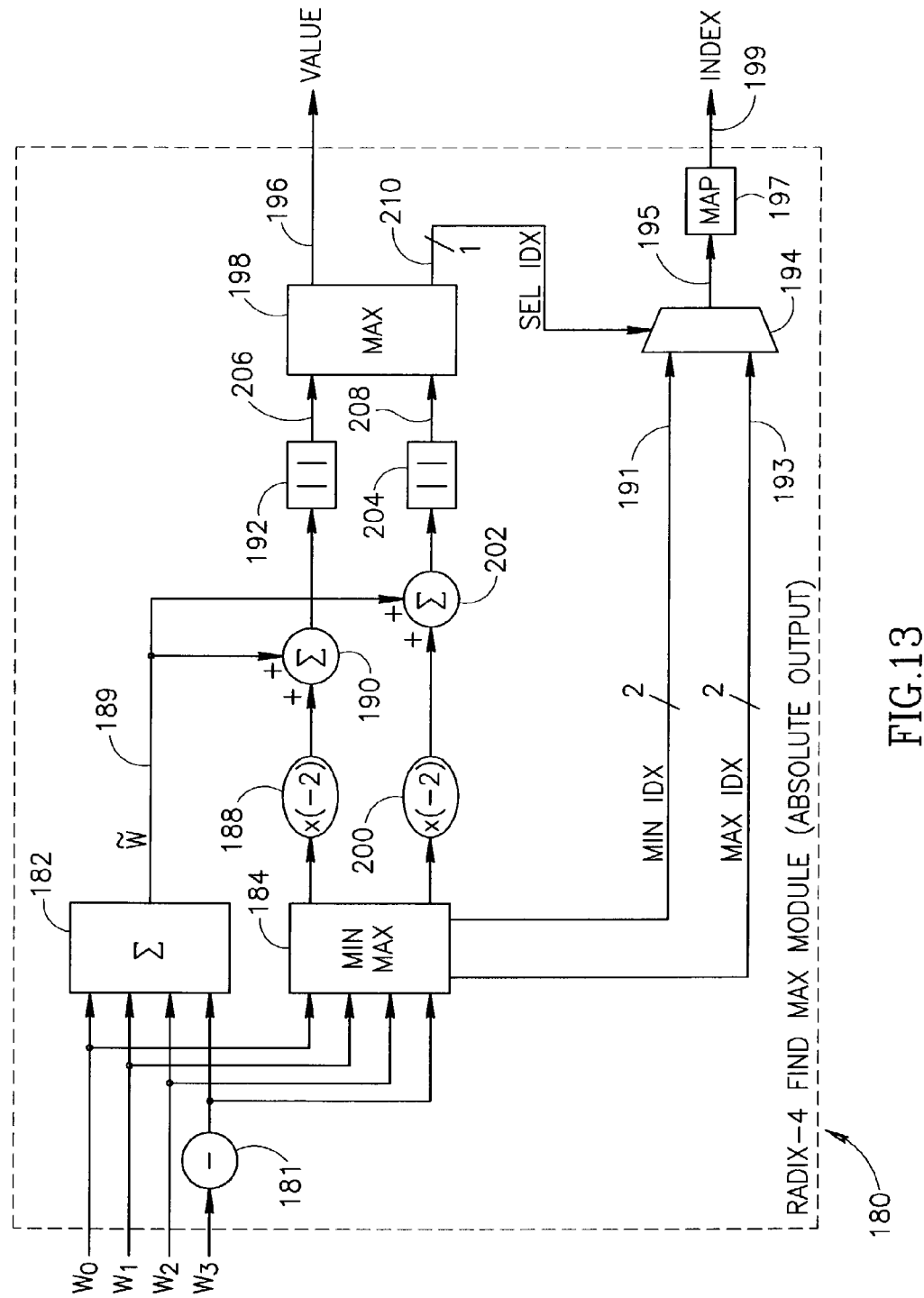
FIG. 13 is a block diagram illustrating the radix-4 find maximum mechanism constructed in accordance with the present invention.

A block diagram illustrating an embodiment of the radix-4 find maximum module adapted to generate absolute value outputs constructed in accordance with the present invention is shown in FIG. 13. The radix-4 find-max module, generally referenced 180, implements the expression for the maximum shown in Equation 28. The quantity $\tilde{w}$ 189 is generated via block 182 while the min and max are determined via block 184. To reduce complexity, the arguments of the max and min in Equation 28 are reversed in sign and the min and max are determined instead. Thus, only a single sign reversal 181 is required.

The min output of block 184 is multiplied by −2 (binary shift left and complement) via multiplier 188 and subtracted from $\tilde{w}$ via adder 190. Alternatively, a multiplication by 2 and subtraction can be used. The absolute value 206 of the difference is generated via block 192 and the result input to max block 198. Similarly, the max output of block 184 is multiplied by −2 (binary shift left and complement) via multiplier 200 and subtracted from $\tilde{w}$ via adder 202. The absolute value 208 of the difference is generated by block 204 and the result input to max block 198. The two-bit MIN IDX signal 191 and two-bit MAX IDX signal 193 are input to a multiplexer 194 whose select control comprises the one-bit IDX signal 210 output of the max block 198. The output of the multiplexer comprises a max index 195 which is permuted via map block 197 to generate the output index 199. The maximum of input signals 206, 208 is determined by the max block 198 and output as the max value 196. Note that alternatively, instead of applying the map block 197, the inputs to the min-max block 184 can be permutated such that $w_0$ is input into input 3 of the block, $w_1$ to input 1, $w_2$ to input 2 and $-w_3$ to input 0.

Figure 14:
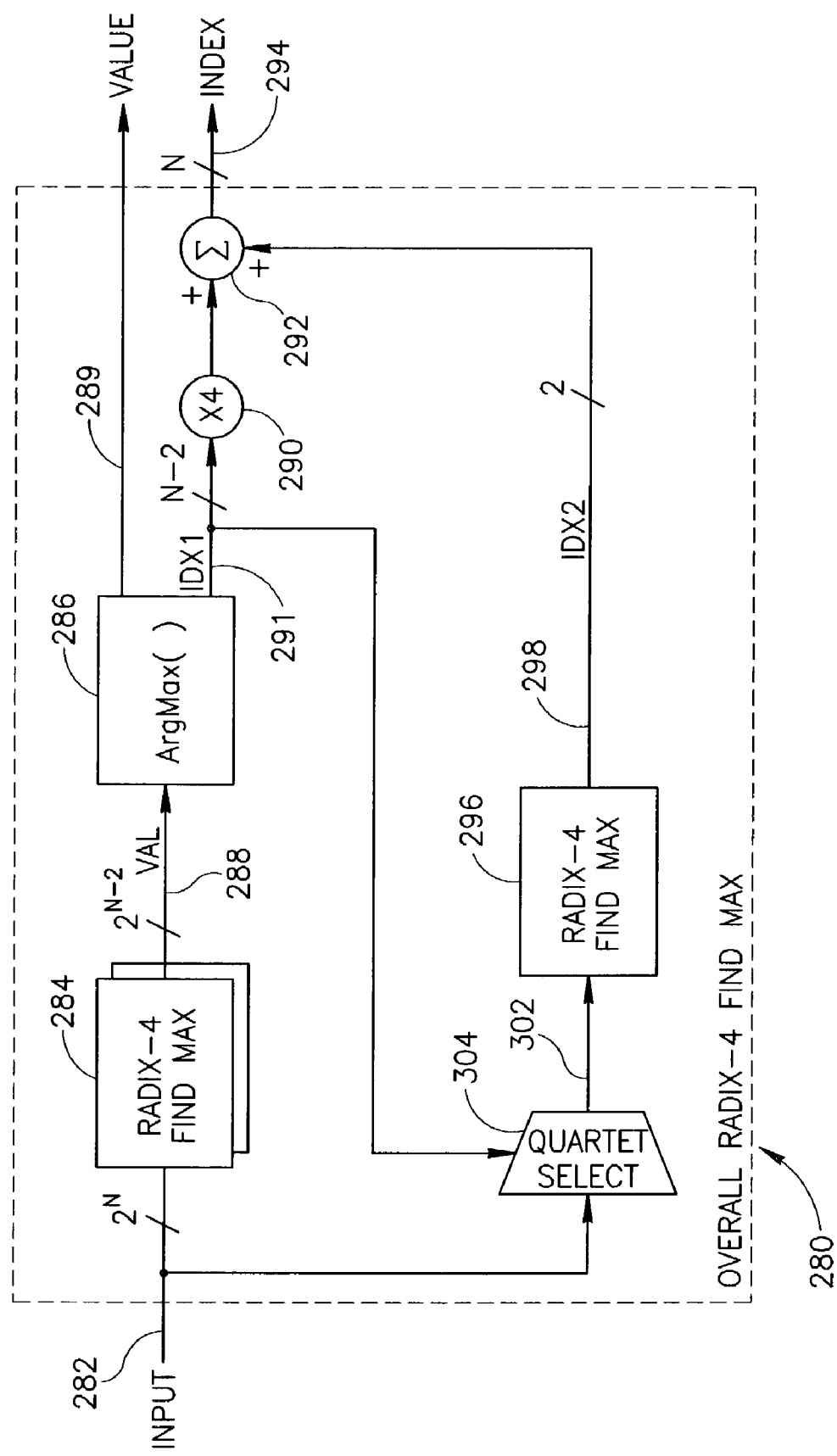
FIG. 14 is a block diagram illustrating the overall radix-4 find max scheme of the present invention.

A block diagram illustrating the overall radix-4 find-max scheme of the present invention is shown in FIG. 14. The overall radix-4 find-max block, generally referenced 280, comprises $2^{N-2}$ radix-4 find-max modules 284 adapted to receive $2^N$ input signals 282 from the output of the N−2$^{nd}$ stage of a FHT of size $2^N \times 2^N$. The last two stages of the FHT are replaced by the overall radix-4 find-max module which utilizes a plurality of radix-4 find-max sub blocks described above and shown in FIG. 13. Each radix-4 find-max module is operative to output a max value VAL 288 and index while the index is ignored. Thus, the radix-4 find-max modules generate $2^{N-2}$ max value outputs. The $2^{N-2}$ max values 288 are input to an argmax( ) block 286 which functions to output the overall absolute maximum value 289 and an index signal IDX1 291 comprising N−2 bits.

A multiplexer 304 is adapted to receive the $2^N$ input signals as $2^{N-2}$ signal quartets. The index 291 is used as the select for the multiplexer and is operative to select a single quartet 302 of the original $2^N$ inputs for output that corresponds to the quartet that generated the maximum value 289. The selected quartet 302 is input to another radix-4 find-max module 296 which functions to determine the max index IDX2 298 from among the four input signals. The module 296 generates a two-bit index IDX2 298 which is combined with the N−2 bit index 291 via summer 292 to generate the overall N bit index 294. Multiplier 290 functions to shift left the N−2 bit IDX1 value which is then used as the MSBs of the output index. The IDX2 signal provides the two LSBs of the output index. As the index outputs of blocks 284 and value output of block 296 are not used, reduced functionality radix-4 find-max blocks can be used instead to further minimize the resources required for implementation.

Figure 15:
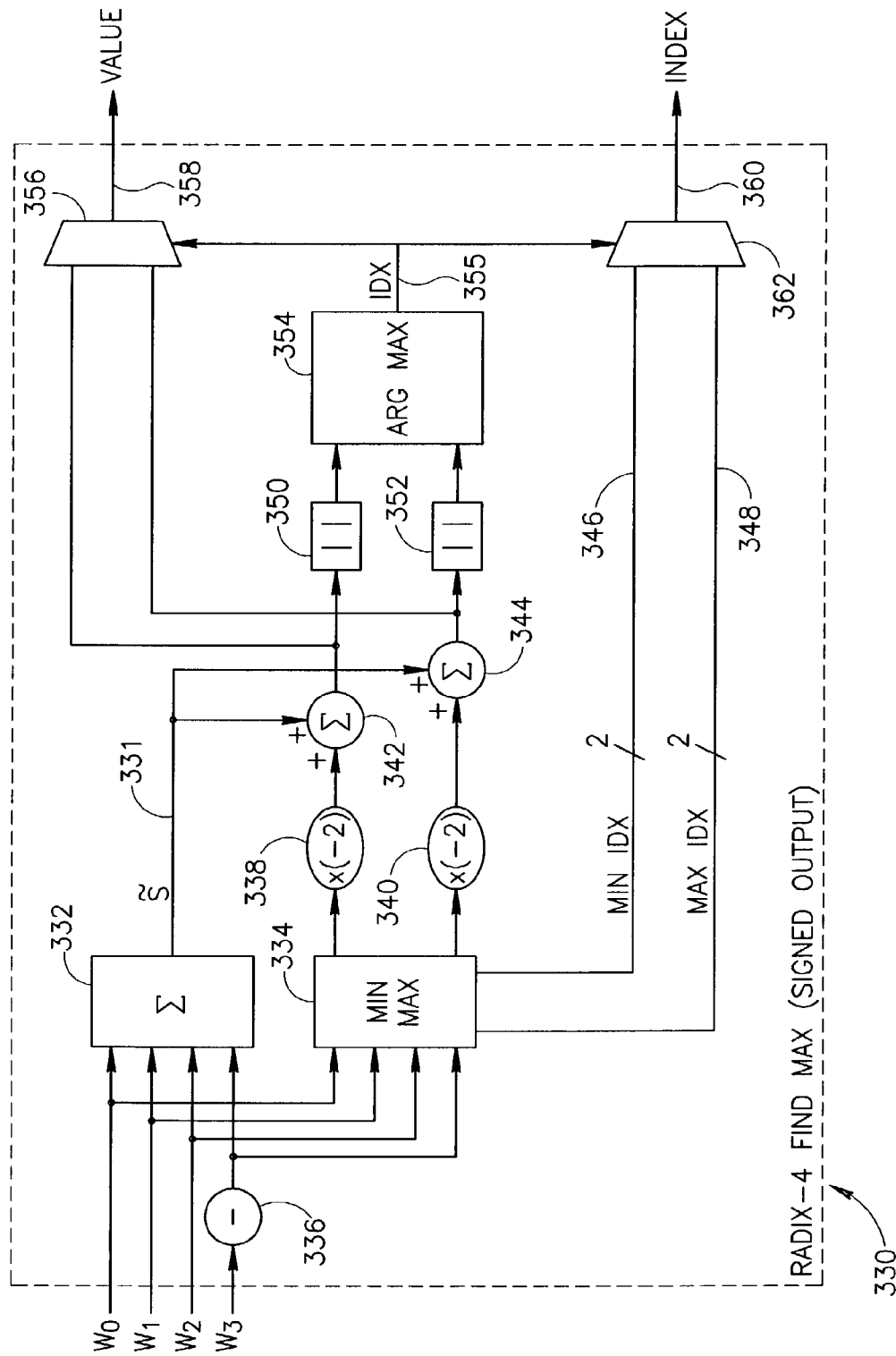
FIG. 15 is a block diagram illustrating the radix-4 find maximum mechanism adapted to generate signed outputs constructed in accordance with the present invention.

A block diagram illustrating an embodiment of the radix-4 find-max module adapted to generate signed outputs constructed in accordance with the present invention is shown in FIG. 15. The radix-4 find-max module of FIG. 13 described hereinabove, is adapted to generate $\max\{|H_4\underline{w}|\}$ as the output value. Often, however, it is necessary to use a radix-4 find-max module that generates the actual signed value of $H_4\underline{w}$ that has the max $\{|\cdot|\}$ value. The following radix-4 find-max module shown in FIG. 15 is adapted to generate a signed output value.

For the inputs $w_0$, $w_1$, $w_2$, $w_3$: $s_0=w_0$; $s_1=w_1$; $s_2=w_2$; $s_3=-w_3$, and $\tilde{s}=s_0+s_1+s_2+s_3$. The following are defined as follows $$MININP=\min\{s_3,s_1,s_2,s_0\}$$

$$MAXINP=\max\{s_3,s_1,s_2,s_0\} \quad (29)$$

$$MINIDX=\arg\min\{s_3,s_1,s_2,s_0\}$$

$$MAXIDX=\arg\max\{s_3,s_1,s_2,s_0\}$$

Further, IDX1 is given by:

$$IDX1=\arg\max\{|\tilde{s}-2MAXINP|,|\tilde{s}-2MININP|\} \quad (30)$$

and the VALUE output is given by:

$$INDEX = \begin{cases} MAXIDX & IDX1=0 \\ MINIDX & IDX1=1 \end{cases} \quad (31)$$

and the INDEX output is given by:

$$VALUE = \begin{cases} 2s[INDEX]-\tilde{s} & INDEX=3 \\ \tilde{s}-2s[INDEX] & ELSE \end{cases} \quad (32)$$

The implementation of the above equations is presented below in Listing 1 in the form of MATLAB code adapted to work with minimal index equal to 1.

Listing 1: MATLAB Code to Implement Radix-4 Find Max with Signed Outputs

```
function [ val , idx ] = fht4max ( w )
s = [ - w( 4 ) w( 2 ) w( 3 ) w( 1 ) ] ;
ts = sum( s ) ;
[ mininp , minidx ] = min( s ) ;
[ maxinp , maxidx ] = max( s ) ;
[ dummy, idx1 ] = max( [ abs ( ts − 2*maxinp ) abs ( ts − 2*mininp ) ] ) ;
if idx1 = 1
    idx = maxidx ;
else
    idx = minidx ;
end
if idx = 4
    val = 2*s( idx ) - ts ;
else
    val = ts − 2*s( idx ) ;
end
```

The radix-4 find-max module, generally referenced 330, implements the expressions for the maximum described above in Equations 29–32. The quantity $\tilde{s}$ 331 is generated via block 332 while the min and max are determined via block 334. The min output of block 334 is multiplied by −2 (binary shift left and complement) via multiplier 338 and subtracted from $\tilde{s}$ via adder 342. Alternatively, a multiplication by 2 and subtraction can be used. The absolute value of the difference is generated via block 350 and the result input to argmax block 354.

Similarly, the max output of block 334 is multiplied by −2 (binary shift left and complement) via multiplier 340 and subtracted from V via adder 344. The absolute value of the difference is generated by block 352 and the result input to argmax block 354. The two-bit MIN IDX signal 346 and two-bit MAX IDX signal 348 are input to a multiplexer 362 whose select control comprises the one-bit IDX signal 355 output of the argmax block 354. The output of the multiplexer 362 comprises the output INDEX signal 360.

The output of the summers 342, 344 are input to a second multiplexer 356 whose select line is the one bit IDX output 355 from the argmax module 354. The output of the multiplexer constitutes the output max VALUE signal 358.

Figure 16:
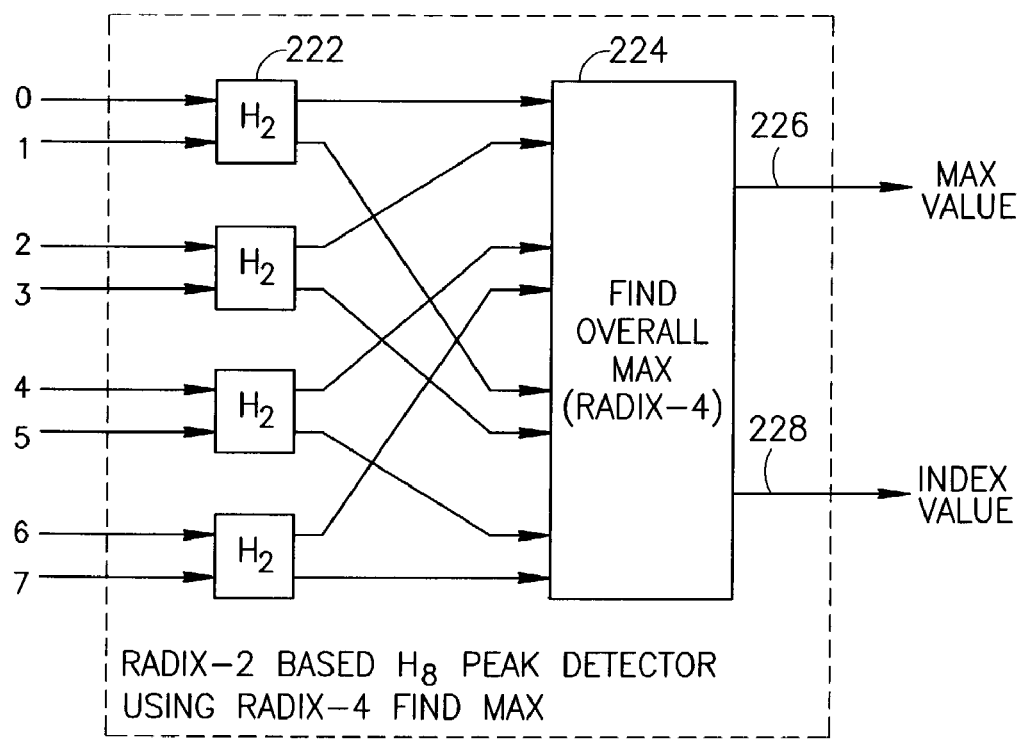
FIG. 16 is a block diagram illustrating a radix-2 based $H_8$ fast Hadamard transform peak detector utilizing the radix-4 find maximum of the present invention.

A block diagram illustrating a radix-2 based $H_8$ fast Hadamard transform peak detector utilizing the radix-4 find maximum of the present invention is shown in FIG. 16. In accordance with the present invention, a plurality of radix-2 FHT modules and a radix-4 find-max module are used to generate the maximum FHT output and associated index. Each group of four outputs from the N−$2^{nd}$ stage is input to a radix-4 find-max module. In this example system, generally referenced 220, a plurality of $H_2$ FHT modules 222 comprise a first transform stage. The find-overall-max module 224 takes the place of the $H_4$ FHT modules that would make up the final transform stage.

The find-overall-max module 224 functions to determine the overall maximum 226 and the index 228 corresponding thereto. The find-max module 224 is constructed in accordance with FIG. 13 and comprises a plurality of radix-4 find-max modules 180 as described supra, one for each group of four outputs from the N−$2^{nd}$ stage. The maximums generated by the entirety of individual radix-4 find-max modules 180 are compared and the overall maximum determined. The index is determined by selecting one of the groups of four outputs corresponding to the maximum and performing a radix-4 FHT as described above on the selected group. The absolute values are taken and the argument of the maximum of the absolute values is determined which is used to make up the LSBs of the index. The MSBs are determined in a similar manner as they are in the radix-2 find-max module described supra. They are determined taking the argmax of the group of four outputs that yields the maximum value.

Figure 17:
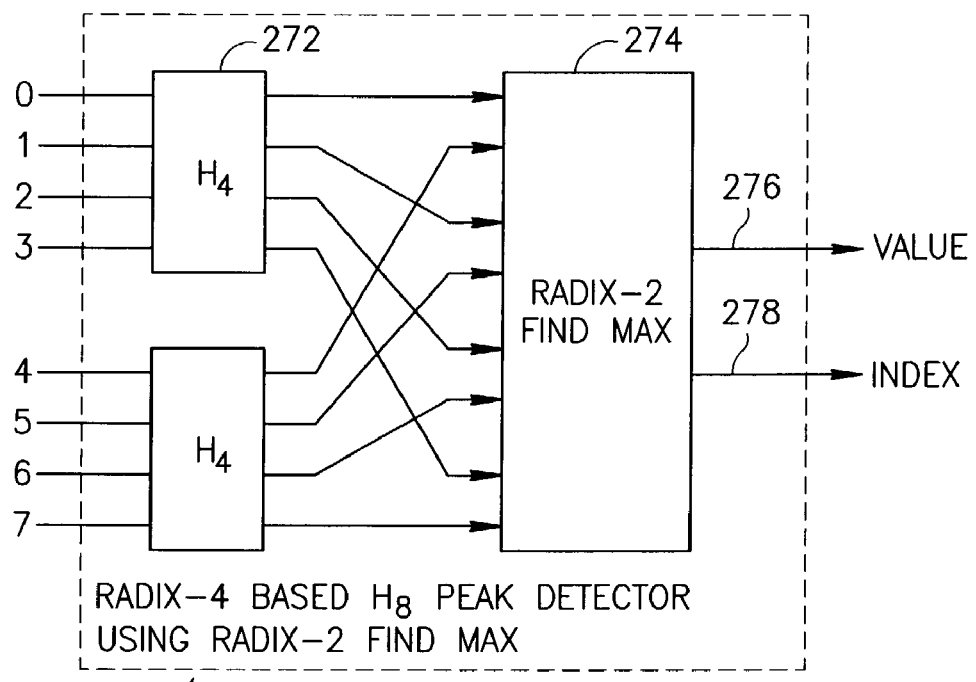
FIG. 17 is a block diagram illustrating a radix-4 based $H_8$ fast Hadamard transform peak detector utilizing the radix-2 find maximum of the present invention.

A block diagram illustrating a radix-4 based $H_8$ fast Hadamard transform peak detector utilizing the radix-2 find maximum of the present invention is shown in FIG. 17. In accordance with the present invention, a plurality of radix-4 FHT modules and a radix-2 find-max module are used to generate the maximum FHT output and associated index. In this example system, generally referenced 270, a plurality of $H_4$ FHT modules 272 comprise a first transform stage adapted to generate the outputs of the N–$1^{st}$ equivalent stage. The outputs of this stage are input to the radix-2 find-overall-max module 274 that replaces the $H_2$ FHT modules that would make up the final transform stage.

The find-overall-max module 274 functions to determine the overall maximum 276 and the index 278 corresponding thereto. The find-max module 274 is constructed in accordance with the radix-2 find-max block of FIG. 11 described in detail supra. The find-max block 274 comprises a radix-2 find-max module as in FIG. 9. The maximums generated by all the individual radix-2 find-max modules are compared and the overall maximum determined. The index is determined by selecting one of the groups of two outputs corresponding to the maximum and performing a radix-2 FHT as described above on the selected group. The absolute values are taken and the argument of the maximum of the absolute values is then determined, which is used to make up the LSB of the index. The MSBs are determined by taking the argmax of the group of two outputs that yields the maximum value.

Computer Embodiment

Figure 18:
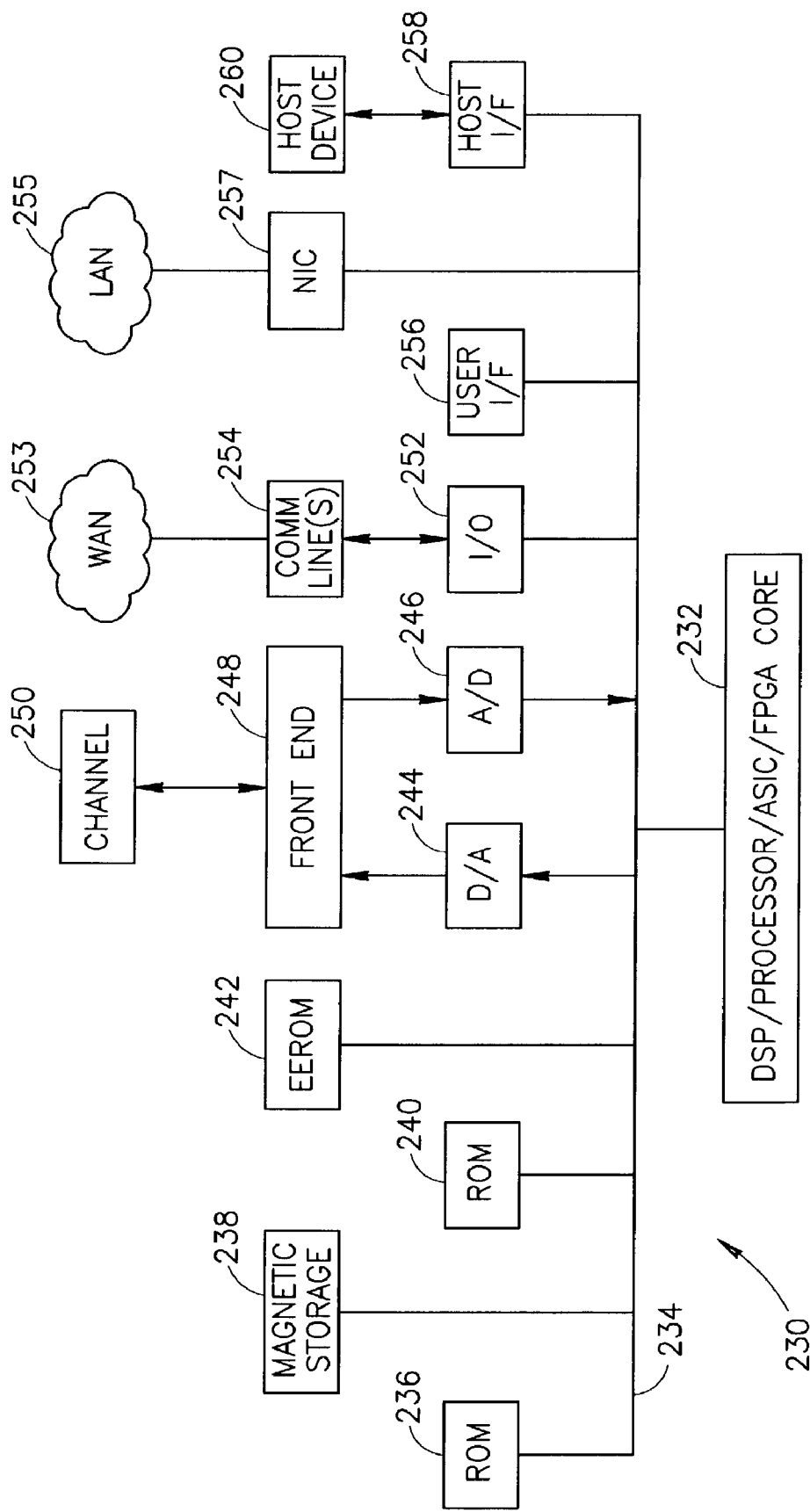
FIG. 18 is a block diagram illustrating an example computer-processing platform suitable for implementing the fast Hadamard transforms and peak detectors of the present invention.

Note that the reduced complexity radix-4 FHT and find-maximum mechanism of the present invention may be implemented in either hardware, software or a combination of hardware and software. For example, a computer may be programmed to execute software adapted to perform the reduced complexity radix-4 FHT and find-maximum mechanism of the present invention or any portion thereof. A block diagram illustrating an example computer-processing platform suitable for executing the reduced complexity radix-4 FHT and find-maximum mechanism of the present invention is shown in FIG. 18. The system may be incorporated within a communications device such as a PDA, mobile user equipment (UE) (i.e. handsets), base stations, cordless telephone, cable modem, broadband modem, laptop, PC, network transmission or switching equipment, network device or any other wired or wireless communications device. The device may be constructed using any combination of hardware and/or software.

The computer system, generally referenced 230, comprises a processor 232 which may be implemented as a microcontroller, microprocessor, microcomputer, ASIC core, FPGA core, central processing unit (CPU) or digital signal processor (DSP), for example. The system further comprises static read only memory (ROM) 236 and dynamic main memory (e.g., RAM) 240 all in communication with the processor. The processor is also in communication, via a bus 234, with a number of peripheral devices that are also included in the computer system.

The device may be connected to a network 253, e.g., WAN, etc. such as the Internet via an I/O interface 252 and one or more communication lines 254. The interface comprises wired and/or wireless interfaces to one or more communication channels. Communications I/O processing transfers data between the network interface and the processor. The computer system may also be connected to a LAN 255 via a Network Interface Card (NIC) 257 adapted to handle the particular wired or wireless network protocol being used, e.g., one of the varieties of copper or optical Ethernet, Token Ring, IEEE 802.3b, 802.3a, etc.

The processor is also in communication, via the bus, with a number of peripheral devices that are also included in the computer system. An A/D converter 246 functions to sample the baseband signal output of the front end circuit 248 coupled to the channel 250. The channel may comprise any information channel such as RF, optical, magnetic storage device (hard disk), etc. Samples generated by the processor are input to the front end circuit via D/A converter 244. The front end circuit comprises receiver, transmitter and channel coupling circuitry.

An optional user interface 256 responds to user inputs and provides feedback and other status information. A host interface 258 connects a host computing device 260 to the system. The host is adapted to configure, control and maintain the operation of the system. The system also comprises magnetic storage device 238 for storing application programs and data. The system comprises computer readable storage medium which may include any suitable memory means including but not limited to magnetic storage, optical storage, CD-ROM drive, ZIP drive, DVD drive, DAT cassette, semiconductor volatile or non-volatile memory, biological memory devices, or any other memory storage device.

Software operative to implement the functionality of the reduced complexity radix-4 FHT and find-maximum mechanism of the present invention or any portion thereof is adapted to reside on a computer readable medium, such as a magnetic disk within a disk drive unit or any other volatile or nonvolatile memory.

Alternatively, the computer readable medium may comprise a floppy disk, Flash memory card, EPROM, EEROM, EEPROM based memory, bubble memory storage, ROM storage, etc. The software being adapted to perform the reduced complexity radix-4 FHT and find-maximum mechanism of the present invention or any portion thereof may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), DSP circuits, wired or wireless implementations and other communication system products.

For the purpose of this document, the term switching systems products shall be taken to mean private branch exchanges (PBXs), central office switching systems that interconnect subscribers, toll/tandem switching centers and broadband core switches located at the center of a service provider's network that may be fed by broadband edge switches or access multiplexers and associated signaling and support system services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of operating a data processor to enable said data processor to perform a radix-4 fast Hadamard tranform, said method comprising the steps of:
    receiving an input sequence $w_0, w_1, w_2, w_3$;
    first calculating a quantity wherein $\tilde{w}=w_0+w_1+w_2-w_3$ comprise a first input, a second input, a third input and a fourth input of said radix-4 fast Hadamard transform, respectively;
    second calculating the quantities $s_0=\tilde{w}+2w_3$, $s_1=\tilde{w}-2w_1$, $s_2=\tilde{w}-2w_2$, $s_3=-\tilde{w}+2w_0$, wherein $s_0, s_1, s_2, s_3$ comprise a first output, a second output, a third output and a fourth output of said radix-4 fast Hadamard transform, respectively;
    outputting said quantities $s_0, s_1, s_2, s_3$ as results of said radix-4 fast Hadamard transform; and
    repeating said steps of receiving, first calculating, second calculating and outputting.

2. The method according to claim 1, wherein multiplication by two comprises a binary shift operation.

3. The method according to claim 1, wherein said steps of calculating are performed using a maximum of seven operations.

4. The method according to claim 1, adapted to be implemented in an Application Specific Integrated Circuit (ASIC).

5. The method according to claim 1, adapted to be implemented in a Field Programmable Gate Array (FPGA).

6. An apparatus for performing a reduced complexity radix-4 fast Hadamard transform, comprising:
    first calculating means for calculating a quantity $\tilde{w}=w_0+w_1+w_2-w_3$ wherein $w_0, w_1, w_2, w_3$ comprise first, second, third and fourth inputs of said radix-4 fast Hadamard transform, respectively; and
    second calculating means for calculating a first fast Hadamard transform output in accordance with the equation $s_0=\tilde{w}+2w_3$;
    third calculating means for calculating a second fast Hadamard transform output in accordance with the equation $s_1=\tilde{w}-2w_1$;
    fourth calculating means for calculating a third fast Hadamard transform output in accordance with the equation $s_2=\tilde{w}-2w_2$; and
    fifth calculating means for calculating a fourth fast Hadamard transform output in accordance with the equation $s_3=\tilde{w}+2w_0$.

7. The apparatus according to claim 6, wherein multiplication by two in said second calculating means, third calculating means, fourth calculating means and fifth calculating means, comprises a binary shift operation.

8. The apparatus according to claim 6, wherein said radix-4 fast Hadamard transform is generated using a maximum of seven operations.

9. The apparatus according to claim 6, adapted to be implemented in an Application Specific Integrated Circuit (ASIC).

10. The apparatus according to claim 6, adapted to be implemented in a Field Programmable Gate Array (FPGA).

11. A method of performing an even order fast Hadamard transform, said method comprising the steps of:
    cascading in series one or more radix-4 fast Hadamard transform stages, each radix-4 fast Hadamard transform stage comprising one or more radix-4 fast Hadamard transform modules; and
    each said radix-4 fast Hadamard transform module adapted to perform the steps of:
        calculating a quantity $\tilde{w}=w_0+w_1+w_2-w_3$ wherein $w_0, w_1, w_3$ comprise a first input, a second input, a third input and a fourth input of said radix-4 fast Hadamard transform, respectively; and
        calculating the quantities $s_0=\tilde{w}+2w_3$, $s_1=\tilde{w}-2w_2$, $s_2=\tilde{w}-2w_2$, $s_3=-\tilde{w}+2w_0$, wherein $s_0, s_1, s_2, s_3$ comprise a first output, a second output, a third output and a fourth output of said radix-4 fast Hadamard transform, respectively.

12. The method according to claim 11, wherein multiplication by two comprises a binary shift operation.

13. The method according to claim 11, wherein each said radix-4 fast Hadamard transform module is adapted to perform said steps of calculating said first output, said second output, said third output and said fourth output using a maximum of seven operations.

14. The method according to claim 11, adapted to be implemented in art Application Specific Integrated Circuit (ASIC).

15. The method according to claim 11, adapted to be implemented in a Field Programmable Gate Array (FPGA).

16. A method of performing a fast Hadamard transform $H_{2^N}$ of order $M=2^N$ wherein N is an odd positive integer greater than or equal to 3, said method comprising the steps of:
    cascading in series one or more radix-4 fast Hadamard transform stages, each radix-4 fast Hadamard transform stage comprising one or more radix-4 fast Hadamard transform modules;
    adding a radix-2 fast Hadamard transform stage to said cascaded series of radix-4 fast Hadamard transforms;
    each said radix-4 fast Hadamard transform module adapted to perform the steps of:
        calculating a quantity $\tilde{w}=w_0+w_1+w_2-w_3$ wherein $w_0, w_1, w_2, w_3$ comprise a first input, a second input, a third input and a fourth input of said radix-4 fast Hadamard transform, respectively; and
        calculating the quantities $s_0=\tilde{w}+2w_3$, $s_1=\tilde{w}-2w_1$, $s_2=\tilde{w}-2w_2$, $s_3=-\tilde{w}+2w_0$, wherein $s_0, s_1, s_2, s_3$ comprise a first output, a second output, a third output and a fourth output of said radix-4 fast Hadamard transform, respectively.

17. The method according to claim 16, wherein multiplication by two comprises a binary shift operation.

18. The method according to claim 16, wherein each said radix-4 fast Hadamard transform module is adapted to perform said steps of calculating said first output, said second output, said third output and said fourth output using a maximum of seven operations.

19. The method according to claim 16, adapted to be implemented in an Application Specific Integrated Circuit (ASIC).

20. The method according to claim 16, adapted to be implemented in a Field Programmable Gate Array (FPGA).

21. A computer program product for use in a computing device, said computer program product comprising:
    a computer usable medium having computer readable program code means embodied in said medium for performing a fast Hadamard transform $H_{2^N}$ of order $M=2^N$ wherein N is a positive integer greater than 2, said computer program product comprising:

computer readable program code means for performing $2^{N-2}$ fast Hadamard transforms on an input so as to generate a first intermediate result;

computer readable program code means for permuting said first intermediate result to generate a first permuted result;

computer readable program code means for performing four $H_{2^{N-2}}$ fast Hadamard transforms on said first permuted result to generate a second intermediate result; and computer readable program code means for permuting said second intermediate result to generate a fast Hadamard transform output.

22. The computer program product according to claim 21, wherein said steps of permuting comprises the steps of performing a permutation of size M whereby inputs are connected to outputs in increments of four until no further outputs are available and subsequently wrapping around and beginning connections with the next available output.

23. The computer program product according to claim 21, wherein for the case of N=4, said steps of permuting comprises connecting inputs to output in accordance with the following table

| Input Index | Output Index | Input Index | Output Index |
|---|---|---|---|
| 0 | 0 | 2 | 8 |
| 4 | 1 | 6 | 9 |
| 8 | 2 | 10 | 10 |
| 12 | 3 | 14 | 11 |
| 1 | 4 | 3 | 12 |
| 5 | 5 | 7 | 13 |
| 9 | 6 | 11 | 14 |
| 13 | 7 | 15 | 15. |

24. The computer program product according to claim 21, wherein each $H_{2^{N-2}}$ fast Hadamard transform is implemented utilizing a plurality of $H_4$ fast Hadamard transform blocks.

25. The computer program product according to claim 24, wherein further optimization is performed whereby two or more cascaded permutations are implemented as a single permutation stage.

26. An apparatus for implementing a fast Hadamard transform $H_{2^N}$ of order $M=2^N$ wherein N is a positive integer greater than 2, comprising:

a first stage adapted to perform $2^{N-2}$ $H_4$ fast Hadamard transforms on an input so as to generate a first intermediate result;

a first permutation stage adapted to permute said first intermediate result to generate a first permuted result;

a second stage adapted to perform four $H_{2^{N-2}}$ fast Hadamard transforms on said first permuted result so as to generate a second intermediate result; and a second permutation state adapted to permute said second intermediate result to generate a fast Hadamard transform output.

27. The apparatus according to claim 26, wherein said first permutation stage and said second permutation state comprises means for performing a permutation of size M whereby inputs are connected to outputs in increments of four until no further outputs are available and subsequently wrapping around and beginning connections with the next available output.

28. The apparatus according to claim 26, wherein for the case of N=4, said first permutation stage and said second permutation state comprises means for connecting inputs to output in accordance with the following table

| Input Index | Output Index | Input Index | Output Index |
|---|---|---|---|
| 0 | 0 | 2 | 8 |
| 4 | 1 | 6 | 9 |
| 8 | 2 | 10 | 10 |
| 12 | 3 | 14 | 11 |
| 1 | 4 | 3 | 12 |
| 5 | 5 | 7 | 13 |
| 9 | 6 | 11 | 14 |
| 13 | 7 | 15 | 15. |

29. The apparatus according to claim 26, wherein each $H_{2^{N-2}}$ fast Hadamard transform comprises means for performing a plurality of $H_4$ fast Hadamard transform blocks.

30. The apparatus according to claim 29, wherein further optimization is performed whereby two or more permutations to be cascaded are implemented as a single permutation stage.

31. A computer program product for use in a computing device, said computer program product comprising:

a computer usable medium having computer readable program code means embodied in said medium far performing a radix-4 fast Hadamard transform, said computer program product comprising:

computer readable program code means for calculating a quantity $\tilde{w}=w_0+w_1+w_2-w_3$ wherein $w_0$, $w_1$, $w_2$, $W_3$ comprise a first input, a second input, a third input and a fourth input of said radix-4 fast Hadamard transform, respectively; and computer readable program code means for calculating the quantities $s_0=\tilde{w}+2w_3$, $s_1=\tilde{w}-2w_1$, $s_2=\tilde{w}-2w_2$, $s_3=-\tilde{w}+2w_0$, wherein $s_0$, $s_1$, $s_2$, $s_3$ comprise a first output, a second output, a third output and a fourth output of said radix-4 fast Hadamard transform, respectively.

* * * * *